United States Patent [19]

Molinari et al.

[11] Patent Number: 6,016,482
[45] Date of Patent: Jan. 18, 2000

[54] ENHANCED COLLATERALIZED FUNDING PROCESSOR

[75] Inventors: Lou Molinari, Far Hills; Steve Gooderum, South Orange, both of N.J.; Keith Peckholdt, Babylon, N.Y.; Frank DiMarco, Valhalla, N.Y.; Michael Jackson, Brooklyn, N.Y.; Ron DePoalo, Ramsey, N.J.; Sunil Makhijani, Fresh Meadow, N.Y.; Jennifer Chung, Nutley; Winnie Chou, Berkeley Height, both of N.J.; Mary Beth Gould, New York, N.Y.

[73] Assignee: Merrill Lynch & Co., Inc., New York, N.Y.

[21] Appl. No.: 08/584,929

[22] Filed: Jan. 11, 1996

[51] Int. Cl.[7] ........................ G06F 17/60
[52] U.S. Cl. ........................ 705/35; 705/39
[58] Field of Search ................ 364/400; 705/1, 705/35, 36, 37, 38, 39

[56] References Cited

U.S. PATENT DOCUMENTS

| | | | |
|---|---|---|---|
| 4,774,664 | 9/1988 | Campbell et al. | 705/38 |
| 4,953,085 | 8/1990 | Atkins | 705/36 |
| 5,239,462 | 8/1993 | Jones et al. | 705/38 |
| 5,644,727 | 7/1997 | Atkins | 705/40 |
| 5,649,116 | 7/1997 | McCoy et al. | 705/38 |
| 5,749,077 | 5/1998 | Campbell | 705/36 |

*Primary Examiner*—Edward R. Cosimano
*Attorney, Agent, or Firm*—Hopgood, Calimafde, Kalil & Judlowe, LLP

[57] ABSTRACT

A computer system is provided for implementing, managing and tracking financial transactions. Various users may use this system to access a database for information retrieval or for entering a set of commands to cause the database to process loan transactions or fund transfers. The system is set up so that these transaction requests may then be conveniently approved or disapproved by the lending institution. There is also a security measure in place to ensure that only proper authorized users may access this respective system to retrieve, confirm, request, alter, or approve the fund transfer.

12 Claims, 43 Drawing Sheets

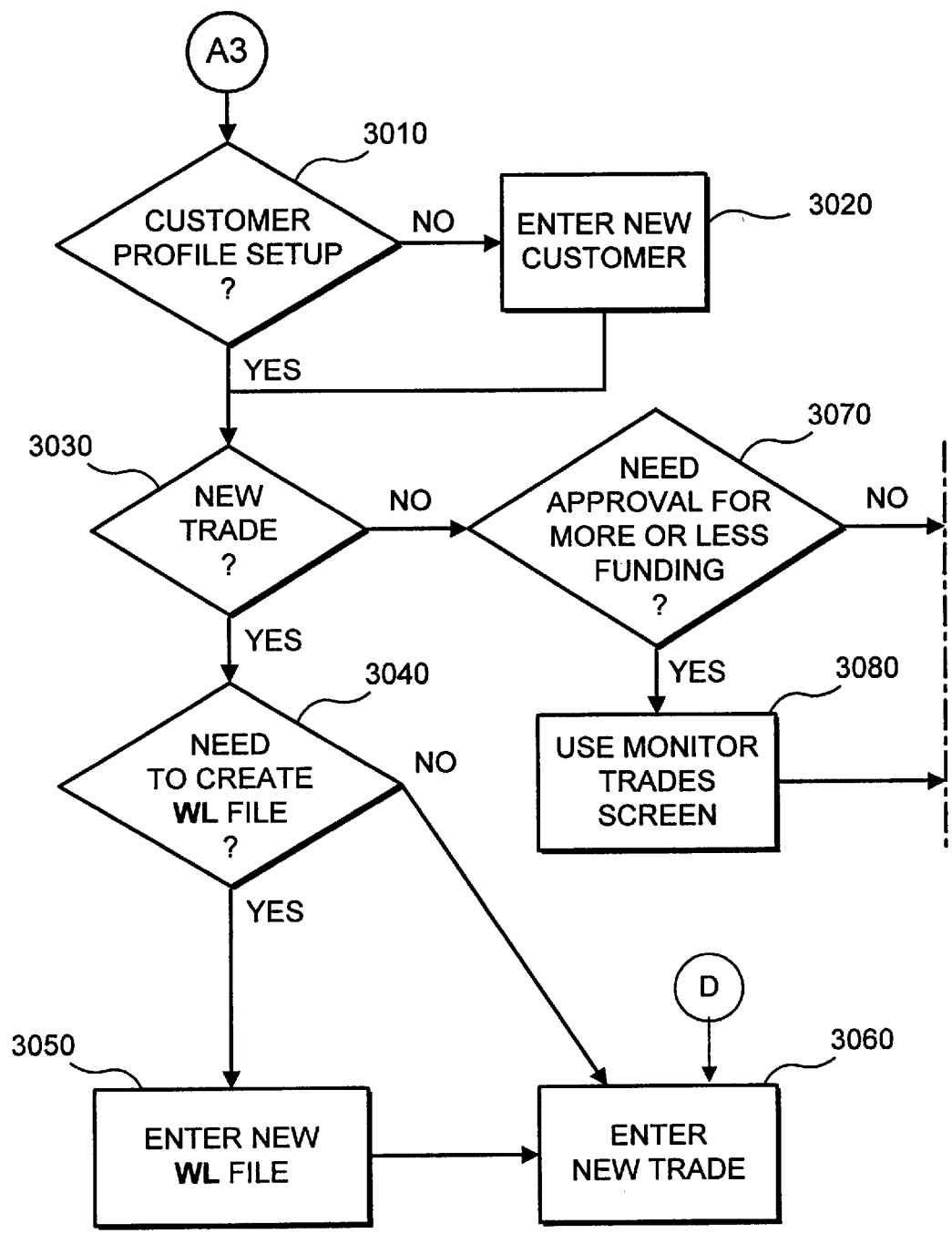
F I G. 3A

Customer Profile Maintenance

4300
| Account # | Customer |
|---|---|
| 999-00000 | SURF MORTGAGE CO |

Customer Information

4310

| Address | City, State, Zip |
|---|---|
| 101 Hudson Street | Jersey City NJ 07302 |

| Attention | Tag ID |
|---|---|
| MS. A | 123456789 |

| Parent Company | Industry Type |
|---|---|
| None | None |

| Defaut Currency | Custodian Bank |
|---|---|
| USA | Chemical Bank |

☐ Active  ☐ Key Client
☐ Reprice/Principal Only  ☐ Balance  ☐ Time Status

Funds Transfer Wiring Instructions

4320

☐ Funds Nettable

| Line Code | ☐ Default |
|---|---|
| 0100 | |

| ABA Number | Bank Name, City, State |
|---|---|
| 011000101 | BIG APPLE NEW YORK NY |

| Account # | Beneficiary Name | Beneficiary Info |
|---|---|---|
| 999-00000 | MR. B | |

| Further Credit To | Further Credit To Beneficiary |
|---|---|
| | |

Legal Agreements

4330

| Entity | Type | Date | Tri-party |
|---|---|---|---|
| | | 12/19/95 | NONE |
| | | | |
| | | | |

Changes saved

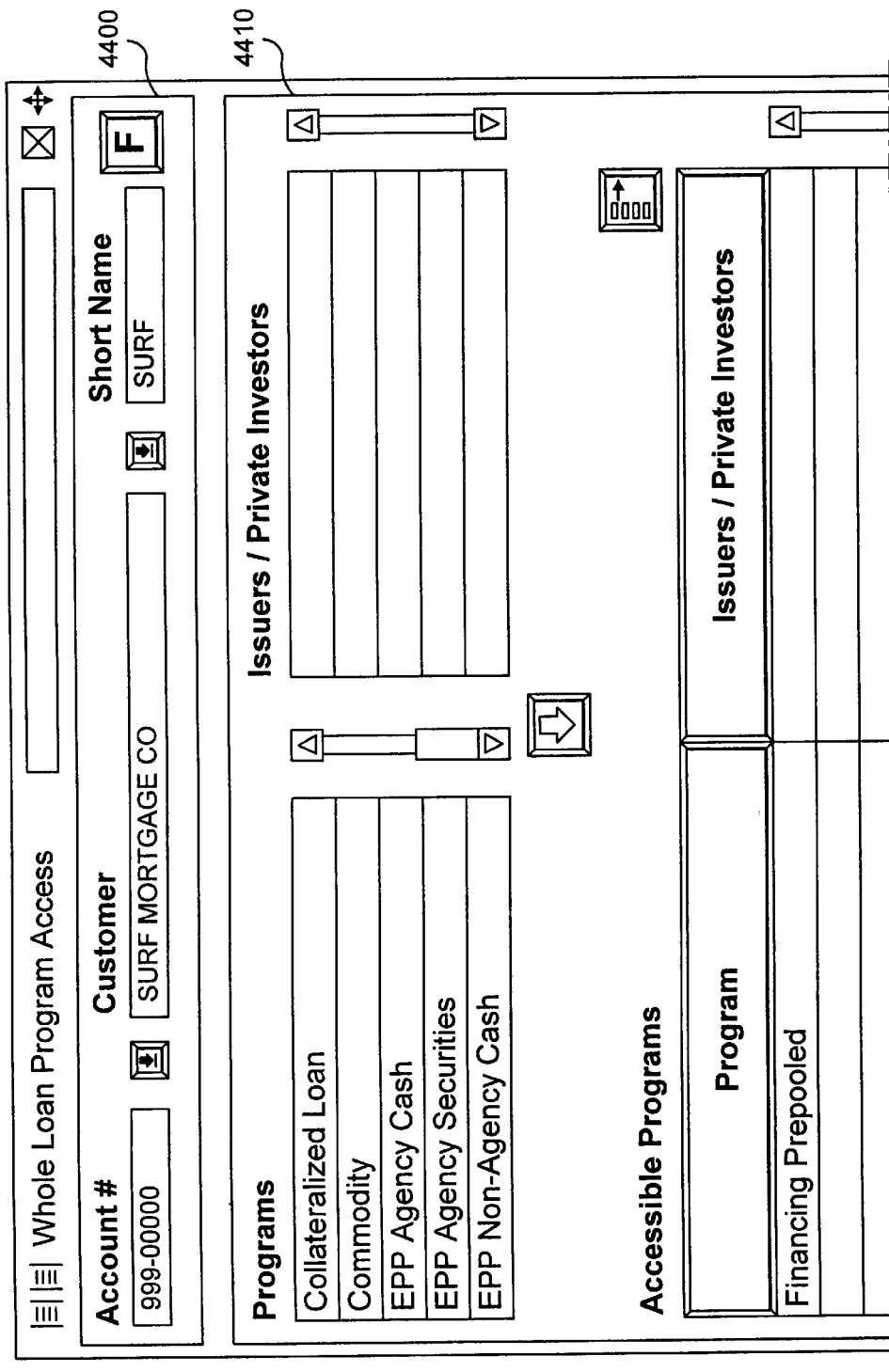
F I G. 4b1

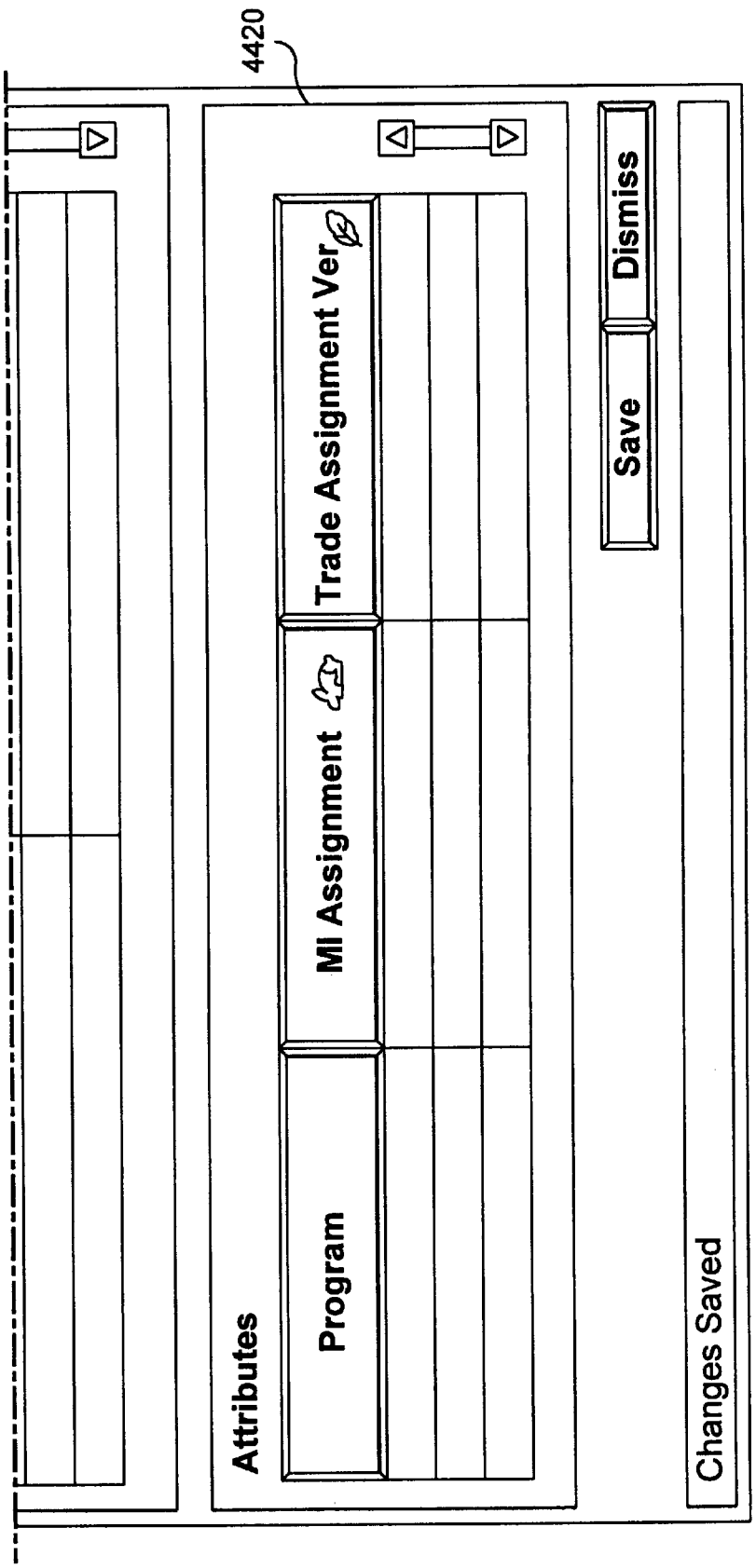
FIG. 4b2

Margin Maintenance Haircuts

Account #: 999-00000  
Customer: SURF MORTGAGE CO  
Short Name: SURF

Last Updated: 12/19/95  
Updated By: wchou  
Exclude Trade For: 3 days ◇ Standard    ◇ Exception

Margin Haircuts

Product Group: MORT - MCI

| Product Type | Margin Haircut (Percent) | DOC Haircut (Percent) |
| --- | --- | --- |
| LDC Debt Peru Non-Citi Restr | 0.000000 | 1.000000 |
| Manuf. Housing | 0.000000 | 1.000000 |
| Mobile Homes | 0.000000 | 1.000000 |
| P.P. Asset-Backed Bonds | 0.000000 | 1.000000 |
| P.P. Asset-Backed Pass-Throu | 0.000000 | 1.000000 |
| Puerto Rican Loans | 0.000000 | 1.000000 |
| Rec. Vehicles | 0.000000 | 1.000000 |

FIG. 4c1

| | |
|---|---|
| Reduced Documentation | 0.000000 | 1.000000 |
| Reimbursement for Advances | 0.000000 | 1.000000 |
| Residential Construction Loan | 0.000000 | 1.000000 |
| Residential Multi-Family 1st | 1.020000 | 1.000000 |
| Residential Multi-Family 2nd | 1.020000 | 1.000000 |
| Residential Single-Family 1st | 1.020000 | 1.000000 |
| Residential Single-Family 2nd | 0.000000 | 1.000000 |
| Residential Securities | 0.000000 | 1.000000 |
| STEER | 0.000000 | 1.000000 |
| Subordinate ARM | 0.000000 | 1.000000 |
| Subordinate Bonds | 0.000000 | 1.000000 |

Edit Default Haircuts

Changes Saved

Save  Dismiss

| Account # | Customer | | Short Name |
|---|---|---|---|
| 999-00000 | SURF MORTGAGE CO | | SURF |

Reinvestment of Interest
Reinvestment Schedule

Remittance of Interest
Remittance Schedule — Weekly

Weekly Timing — Monday

Default Calculation Method
Actual / 360

4600, 4610, 4620, 4630

Bonds Borrowed — 4640

Minimum Fee: 0.00
Substitution Fee: 0.00

Strips: Paid Off
Others: Paid Off

Type of Payment: Money | Par

Structuring Fee

Amount: 0.00
Exp. Date: 01/01/70

Daily Borrowers — 4650

Additional Financing Time: 1:00PM
Paydown Cutoff Time: 3:00PM

[Save] [Dismiss]

Changes Saved

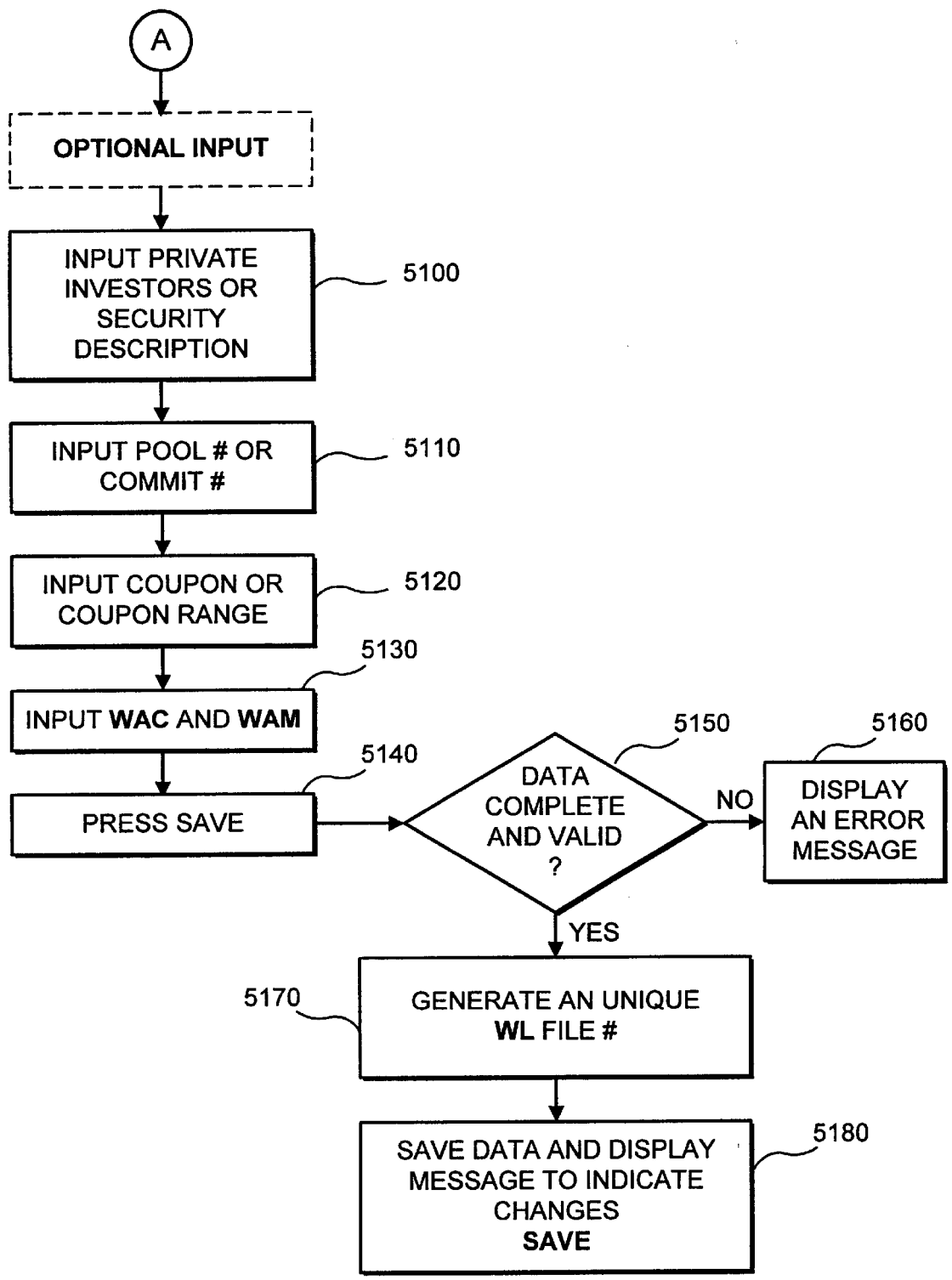
F I G. 5B

FIG. 5A1

Whole Loan File Definition

File Description
- ML Sec: W10803
- Trader Book: MATCHED BOOK
- Entity: MCI
- Margin: 2.000000
- Customer: SURF MORTGAGE CO
- Account #: 999-00000
- Designation: NON-CONFORMING PREPOOLED UNCOMMITTED
- Private Investor:
- Security Description:
- Pool:
- Commitment:
- Coupon: 0.000000
- To: 0.000000
- Custodian: CHEMICAL BANK
- Loan Type: RESIDENTIAL SINGLE-FAMILY 1ST MORTGAGE
- Rate Type: FIXED/ADJUSTABLE

Position
- Original Balance: 10,000,000.00
- Current Balance: 10,000,000.00
- # of Loans: 7
- Price: 100.000000

[File History] [Price History] [Factor History]
[Release] [Activate]

[Save] [Clear]
[Dismiss]

| ML Sec # | Trader Book | Entity | Original Balance | Current Balance | Amt on Repo | Net Availability | Price | Market Value | Designation |
|---|---|---|---|---|---|---|---|---|---|
| W10803 | Matched Book | MCI | 10,000,000.00 | 10,000,000.00 | 0.00 | 10,000,000.00 | 100.000000 | 10,000,000.00 | Non-Conforming |

FIG. 5b1

Whole Loan File History

MDtest: W10803  
Status: Active

| Date | Time Stamp | Price | Pool Factor | Start Original Balance | Additional Original Balance | Original Balance Release | Ending Original Balance | Start Current Balance | Additional Current Balance |
|------|------------|-------|-------------|------------------------|-----------------------------|--------------------------|-------------------------|-----------------------|----------------------------|
| 12/19/95 | 13:57:14 | 100.000000 | 1.000000 | 0.00 | 0.00 | 0.00 | 0.00 | 0.00 | 0.00 |
| 12/19/95 | 14:01:52 | 100.000000 | 1.000000 | 0.00 | 10,000,000.00 | 0.00 | 10,000,000.00 | 0.00 | 10,000,000.00 |

Rows 2     Dismiss

F I G. 5c

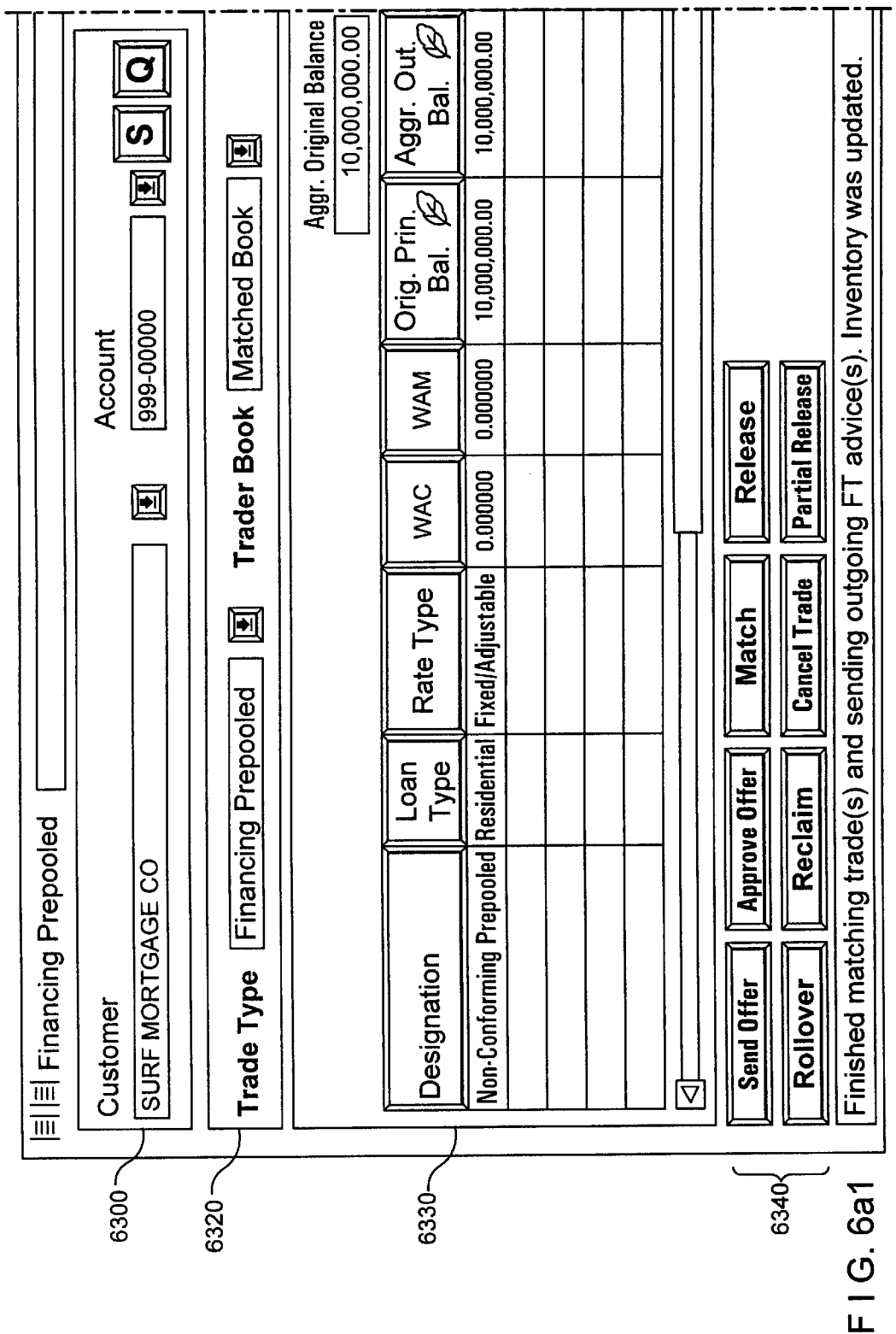
FIG. 6a1

FIG. 6a2

| Program Limit | Program Limit Uzed | Program Limit Remaining |
|---|---|---|
| 100,000,000.00 | 9,800,000.00 | 90,200,000.00 |

☐ Grouping Collaterals  ☐ Showing Entire Offer

| Aggr. Funding Amount | Aggr. Max. Fin. Amount |
|---|---|
| 9,800,000.00 | 9,800,000.00 |

| Number Of Loans | Collateral Price | Purchase Price |
|---|---|---|
| 7 | 100.000000 | 9,800,000.00 |

[Interest Update] [Clear]
[Save] [Dismiss]

6310

Interest Updates

| Ref # | | ML Sec # | Total Contract Interest |
|---|---|---|---|
| 121995 | 1 | W10803 | 0.00 |

Customer Information

Customer Name: SURF MORTGAGE CO

Account #: 999-00000

Interest Account Detail By Date

| Post Day | Date | Principal | Interest Rate | Daily Accrual | Days |
|---|---|---|---|---|---|
| | | | | | |
| | | | | | |
| | | | | | |
| | | | | | |
| | | | | | |

Interest Account Total By Date

FIG. 6c1

Interest Recalculation Data

From   To   New Principal   New Interest Rate

[ ]    [ ]  [       ]       [       ]

Interest Clean Up
?

Total Daily Accrued Interest   Amount Cleaned Up   Remaining Interest

[ 0.00 ]                       [ 0.00 ]            [ 0.00 ]

Total Stored Interest          Amount to Clean Up  Interest Adjustment

[ 0.00 ]                       [ 0.00 ]            [ 0.00 ]

[ Save ]  [ Dismiss ]

WARNING: No Interest Exists for This Trade!

F I G. 6c2

| Funds Transfer Monitor |
| --- |

Current date  12/19/95

Pending only

| Funds Ref # | Date | MB Bank | Customer Name | Cust/Acct | Line Code | ABA# | Amount | DIR | Status | Grouping | Trade Ref. # | Trade Status |
|---|---|---|---|---|---|---|---|---|---|---|---|---|
| 951219000001 | 12/19/95 | 0107 | SURF CO | 999-00000 | SURF | 000000001 | 9,800,000.00 | Out | Pending | Individual | 121995 | 1 Matched |

Total Net Change  -9,800,000.00

| Authorize | Cartel | Line Code | Matching | Netting | Funding | Save | Dismiss |

Rows: 1    Done querying!

Funds Transfer Detail

Customer Information
- Customer Name: SURF MORTGAGE CO
- Customer Acct: 999-00000
- Advice Status: Pending
- Nettable: Yes
- Amount: 9,800,000.00

ML Bank Information
- ML Bank: 0107
- ML Account: 012-23028
- Entity: MCI

Customer Bank
- ABA #: 999-00000
- Name: BIG APPLE

Advice Information
- Code Ref #: 951219000001
- Date Initiated: 12/19/95
- Initiator: wchou

Trade Information
- Trade Ref #: 121995  1
- Trade Status: Matched
- Parameter List: -1
- Object: Financing Prepooled
- Event: Debit Funds

Wiring Instructions
- Account #: 101-01-0101
- Line Code: SURF
- Beneficiary Name: MR. B
- Beneficiary Information:
- Free Form Memo:
- Further Credit To:
- Further Credit To Beneficiary:

[Line Codes]  [Save]  [Dismiss]

Welcome to the Funds Transfer Detail Screen

FIG. 7B

Funding Monitor

Date: 12/19/95

| ML bank | Acct # | Previous Net Anticipated | Incoming Anticipated | Outgoing Anticipated | Net Anticipated | Incoming Actual | Outgoing Actual | Net Actual |
|---|---|---|---|---|---|---|---|---|
| 0107 | 008-12914 | 203,963,482.47 | 108,695.78 | 9,800,000.00 | 194,272,178.25 | 0.00 | 0.00 | 0.00 |
| | | | | | | | | |
| | | | | | | | | |
| | | | | | | | | |
| | | | | | | | | |
| | | | | | | | | |
| | | | | | | | | |

Done calculating positions

Dismiss

Create Funds Transfer

Advice Information
Customer

Amount        ML Bank      Object              Customer Acct        Cash Key    Direction

Wiring Instructions
Beneficiary Name                                Event

Beneficiary Informaton

Free Form Memo                    Trade Information
                                  Trade Ref #         Parameter List
                                  000000000000        -1

Further Credit To                 Customer Bank Information
                                  Line Codes Further Credit To Beneficiary     ABA #               Account #

Bank Name

Line Codes                  Clear        Save        Dismiss

Welcome to the Create Funds Transfer Screen. Please Enter Information to Create a New Advice.

FIG. 7E

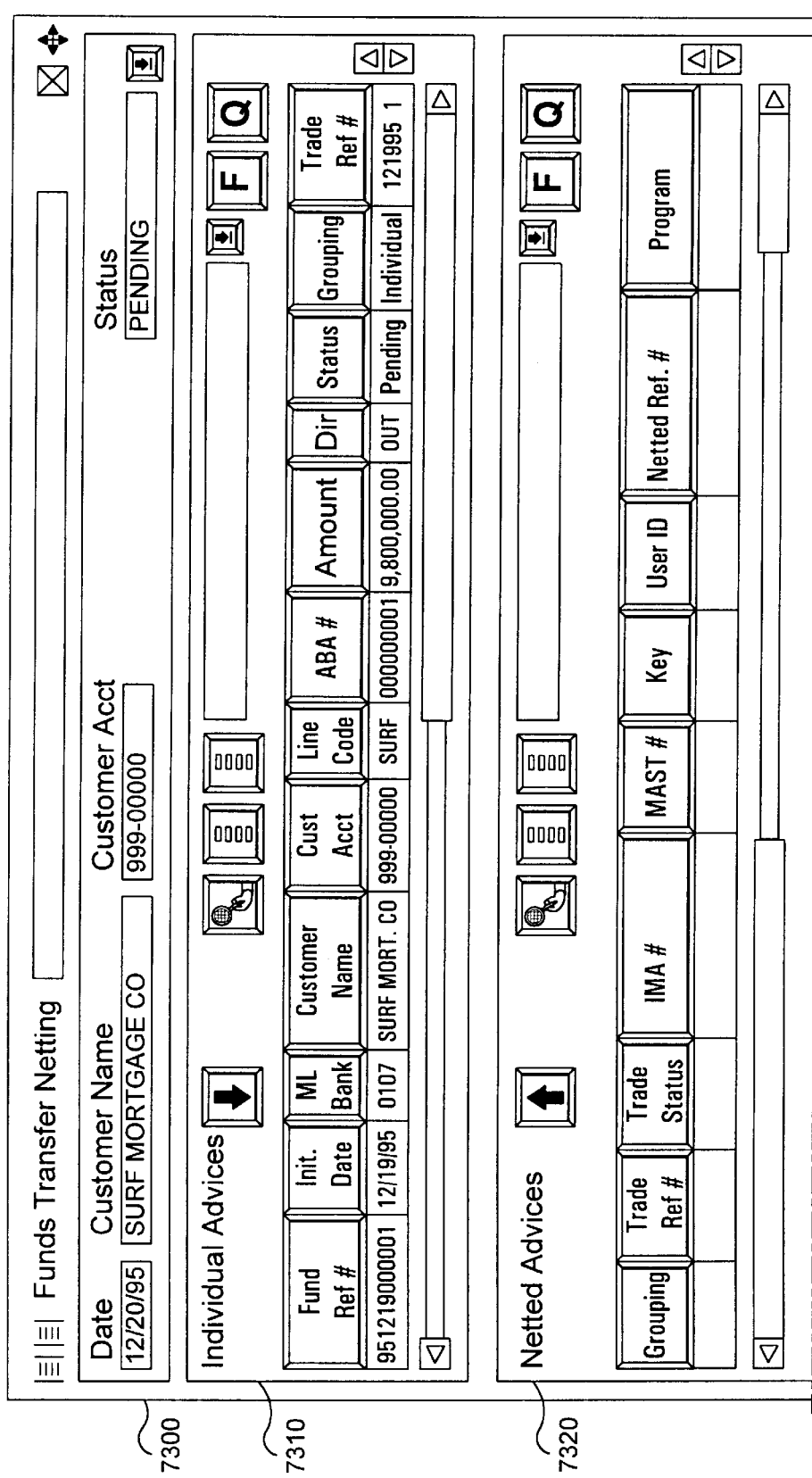
FIG. 7F1

FIG. 7F2

Trade History

Ref # 121995  1  
Related Ref. #  
Program Financing Prepooled  
Customer SURF MORTGAGE CO  
Account 999-00000

| Purchase Price | Activity Date | Time Stamp | Orig. Prin. Bal. | Aggr. Out. Prin. Bal. | Margin | Trade Price | Rate | Accum. Inter. | Stored Interest | Cleaned Up Interest |
|---|---|---|---|---|---|---|---|---|---|---|
| 9,800,000.00 | 12/19/95 | 14:01:50 | 10,000000.00 | 10,000000.00 | 1.02000 | 100.000000 | 5.500000 | 0.00 | 0.00 | 0.00 |
| 9,800,000.00 | 12/19/95 | 14:01:30 | 10,000000.00 | 10,000000.00 | 1.02000 | 100.000000 | 5.500000 | 0.00 | 0.00 | 0.00 |
| 9,800,000.00 | 12/19/95 | 13:53:48 | 10,000000.00 | 10,000000.00 | 1.02000 | 100.000000 | 5.500000 | 0.00 | 0.00 | 0.00 |

Rows 3   Dismiss

FIG. 8C

| |≡| |≡| Confirmation | |
|---|---|

| SURF MORTGAGE CO | Date | Reference # |
|---|---|---|
| 101 Hudson Street | 12/19/95 | 121995 1 |
| Jersey City, NJ 07302 | Program | |
| Attention : MS. A | Financing Prepooled | |

| | Account # |
|---|---|
| Merrill Lynch Mortgage Capital Inc. | 999-00000 |
| 101 Hudson Street, 12/F | |
| Jersey City, NJ 07302 | Type of Confirmation |

Transaction Involving Mortgage Loans

Merrill Lynch Mortgage Capital Inc. ["MCI"] is pleased to confirm your sale and our purchase of the Purchased Securities described below pursuant to the Master Repurchase Agreement (including the supplemented terms set forth in Annex I thereto), dated as of Dec 19, 1995 ["The Master Repurchase Agreement"] between MCI and SURF MORTGAGE CO, under the following terms and conditions.

| | |
|---|---:|
| Orig Principal Amount Of Loans | 10,000,000.00 |
| Current Principal Amount Of Loans | 10,000,000.00 |
| Purchase Date | 12/19/95 |
| Repurchase Date | 12/20/95 |
| Purchase Price | 9,800,000.00 |
| Pricing Rate | 5.500000 |
| Minimum Required Margin | 1.020000 |
| Price Differential Due Date | 12/25/95 |
| Accrued Interest | 1,497.22 |

The Master Repurchase Agreement is incorporated by reference into this Confirmation and made a part hereof as if it were fully set forth herein. All capitalized terms used herein but not otherwise defined shall have the meanings specified in the Master Repurchase Agreement.

| Previous | Next | | Dismiss |
|---|---|---|---|

One confirmation has been found

FIG. 8D

COM Action Definition

9210 — COM Action: AE Credits to MAST

9220 — Format: FF | Origin: Whole Loans | Destination: AE

9230 — COM Action Body:

| Tag | Field Value | Field Length |
|---|---|---|
| Settle Date | endDate | 6 |
| Reference Number | refNum | 12 |
| Activity Code | activeCode | 2 |
| Customer Name | customerName | 24 |
| Customer Account | customerAccount | 8 |
| Buy Sell Flag | buySellFlag | 1 |
| Repo Type | repoType | 1 |
| Principal | principal | 13 |
| Start Date | startDate | 6 |
| AE Account | AEAccount | 4 |
| AE Credit | AECredit | 13 |
| AE Amount | AEAmount | 13 |

Done querying!

FIG. 9B

B&R Action Definition

B&R Action: Cancel & Correct Repo

Action Contents

| IE Type | Debit | Credit | DR bl | CR bl | Amount | As Of | E | Trade Ref |
|---------|----------|----------|------|------|------------------|-------|---|--------------|
| CXL | Customer |  | WMRP |  | OldPrincipalf | asOf | W | tradeRefNur |
| CXL | Customer |  | WMRI |  | OldTotalInter | asOf | W | tradeRefNur |
| OPEN |  | Customer |  | WMRP | PrincipalAmo | asOf | W | tradeRefNur |

Done querying!

FIG. 9C

B&R End Of Day Log

Today date: 12/19/95    today

| Row | Sequen | Date | Time | Trade Ref Num | IEType | Debit | Credit | DRBoi | GRBoi | Amount | As Of | Entity | Sent Sta |
|---|---|---|---|---|---|---|---|---|---|---|---|---|---|
| 1 | 399361 | 12/19/95 | 14:18 | 121995 1 | OPEN | 999-00000 | | WMRV | | 9,800,000.00 | | W | W |
| 2 | 399361 | 12/19/95 | 14:18 | 121995 1 | FDS | | 999-00000 | | FDS | 9,800,000.00 | | W | W |
| 3 | | | | | | | | | | | | | |
| 4 | | | | | | | | | | | | | |
| 5 | | | | | | | | | | | | | |
| 6 | | | | | | | | | | | | | |
| 7 | | | | | | | | | | | | | |
| 8 | | | | | | | | | | | | | |
| 9 | | | | | | | | | | | | | |

Credit Balance: 9,800,000.00   Debit Balance: 9,800,000.00   Net Total Balance: 0.00

Row 2  Query is done.   Dismiss

Placeholder Definition

Placeholder Name

AEAccount

Type COM Field

SQL Definition Text

SELECT ML sales AE from CP-Customer Accounts where account Num = ( select accountNum from WL_ Trade where tradeRefNum = "    tradeRefNum")

Save    Dismiss

Done querying!

ENHANCED COLLATERALIZED FUNDING PROCESSOR

FIELD OF THE INVENTION

This invention relates generally to computer systems for implementing, managing and tracking financial transactions. More specifically, the invention relates to a computer system for providing access to and processing various operations related to Whole Loan Funding transactions, including funding applications, approvals, confirmations, monitoring, and funds transfers.

BACKGROUND OF THE INVENTION

In recent years, financial institutions have developed various type of financing transactions to provide funds in exchange for different forms of collateral. A popular and growing type of such transactions is Whole Loan Funding, in which customers (which may be individuals, banks, etc.) pledge as collateral or sell whole loans to a lending institution (such as Merrill Lynch) in return for funds. The whole loans often consists of various mortgage obligations which have not been securitized. Through these transactions, customers can quickly convert their mortgage loan assets into liquid assets with minimal transaction costs. A number of transactions take place under the umbrella term "Whole Loan Funding" as is obvious to those skilled in the art. Some of the particular types of transactions will be discussed in the Detailed Description below.

Whole Loan Funding transactions are now conducted largely through paper operations. Loan applications were telecopied, hand-delivered or phoned and transcribed to officers in the lending institutions who would manually check the customer's creditworthiness, trade history and current loan parameters. Decisions were then made as to the discount rate applied to the collateral (the "haircut") and the total funds the lending institution is willing to supply the customer. Confirmations with proposed loan amounts would then be sent (via telecopier, courier, phone, etc.) to the customer for consideration/acceptance. Officers would then process the trade manually, including issuing the necessary funds transfer advices (also initially through a paper authorization) to the lending institution's cash bank and the custodian bank holding the pledged assets.

From the lending institution's point of view, information is critical to the success of a Whole Loan Funding program. Customer's trade histories, the daily status of existing accounts, the value and performance of pledged assets, and updates to the profit/loss of individual accounts as well as various aggregates of this data are just a few examples of types of information that can assist officers in approving loans and also assist the institution in maintaining a profitable program. Given the volume of trades that take place daily and therefore, the volume of paper, it is a practical impossibility to manually organize and then cull and collate information on any large scale. It is also time consuming, if not difficult, for customers to obtain information relating to their trades, as the information must be manually retrieved and relayed to the customer by an Operations Officer.

Existing computer systems and software, such as commercial spreadsheet programs, have eased the labor burden of the Whole Loan Funding program somewhat, although only as it relates to the internal workings of the lending institution. Some information relating to various trades and loans can be entered into spreadsheets that will perform calculations, such as interest calculations, and retain some information relating to customers' transactions, such as the total funds transferred and the amount of collateral pledged. However, such systems do nothing to alleviate the burden placed on customers and officers in communicating and consummating transactions or in providing customers with valuable information relating to their transactions.

SUMMARY OF THE INVENTION

In view of the foregoing deficiencies of existing systems, it is an object of the invention to provide a computer system to improve operational aspects of certain financial transactions.

It is another object of the invention to provide a computer system having direct customer access for trade entry and information/confirmation retrieval.

It is a further object of the invention to provide a computer system capable of outputting information on individual and aggregate accounts on a real-time basis.

It is yet another object of the invention to provide a computer system that assists lending institution officers in the approval and monitoring of various transactions.

It is a still further object of the invention to provide a computer system that can process funds transfers and that provides appropriate security at all levels of operations.

It is another object of the invention to provide a computer system that is simple and economical to produce and operate and produces significant savings through the reduction of time- and cost-intensive operations.

In accordance with the objects of the invention, a system is provided for implementing, managing and tracking financial transactions within a lending institution such that users may input and process loan transactions. The system is comprised of a database means for storing and retrieving data relating to a transaction. Other elements of the system process, display and manipulate the transaction data in various ways described below. Among the various possible results of such processing, the system may generate a funds transfer advice to effectuate the transaction.

BRIEF DESCRIPTION OF THE DRAWINGS

The foregoing and other objects and advantages will become apparent to those skilled in the art upon reading the following detailed description of the preferred embodiments in conjunction with a review of the appended drawings, in which:

FIG. 4a is a Customer Profile Maintenance screen of the present invention;

FIG. 4b is a Whole Loans Program Access screen of the present invention;

FIG. 4c is a Margin Maintenance Haircuts screen of the present invention;

FIG. 4d is a General Fee screen of the present invention;

FIG. 5 is a functional flowchart for entering a new Whole Loan file into the system of the present invention;

FIG. 5b is a Whole Loan Inventory screen of the present invention;

FIG. 5c is a Whole Loan File History screen of the present invention;

FIG. 7a is a Funds Transfer Monitor screen of the present invention;

FIG. 7b is a Funds Transfer Detail screen of the present invention;

FIG. 7c is a Funds Monitor screen of the present invention;

FIG. 7d is a Create Funds Transfer screen of the present invention;

FIG. 7e is a Funds Transfer Matching screen of the present invention;

FIG. 7f is a Funds Transfer Netting screen of the present invention;

FIG. 8c is a Trade History screen of the present invention;

FIG. 8d is a Confirmation screen of the present invention;

FIG. 8e is an Interest Updates screen of the present invention;

FIG. 9b is a Com Action Definition screen of the present invention;

FIG. 9c is a B&R Action Definition screen of the present invention;

FIG. 9d is a Placeholder Definition screen of the present invention;

FIG. 9e is a B&R End of Day Log screen of the present invention; and

DETAILED DESCRIPTION OF THE PREFERRED EMBODIMENTS

Figure 1:
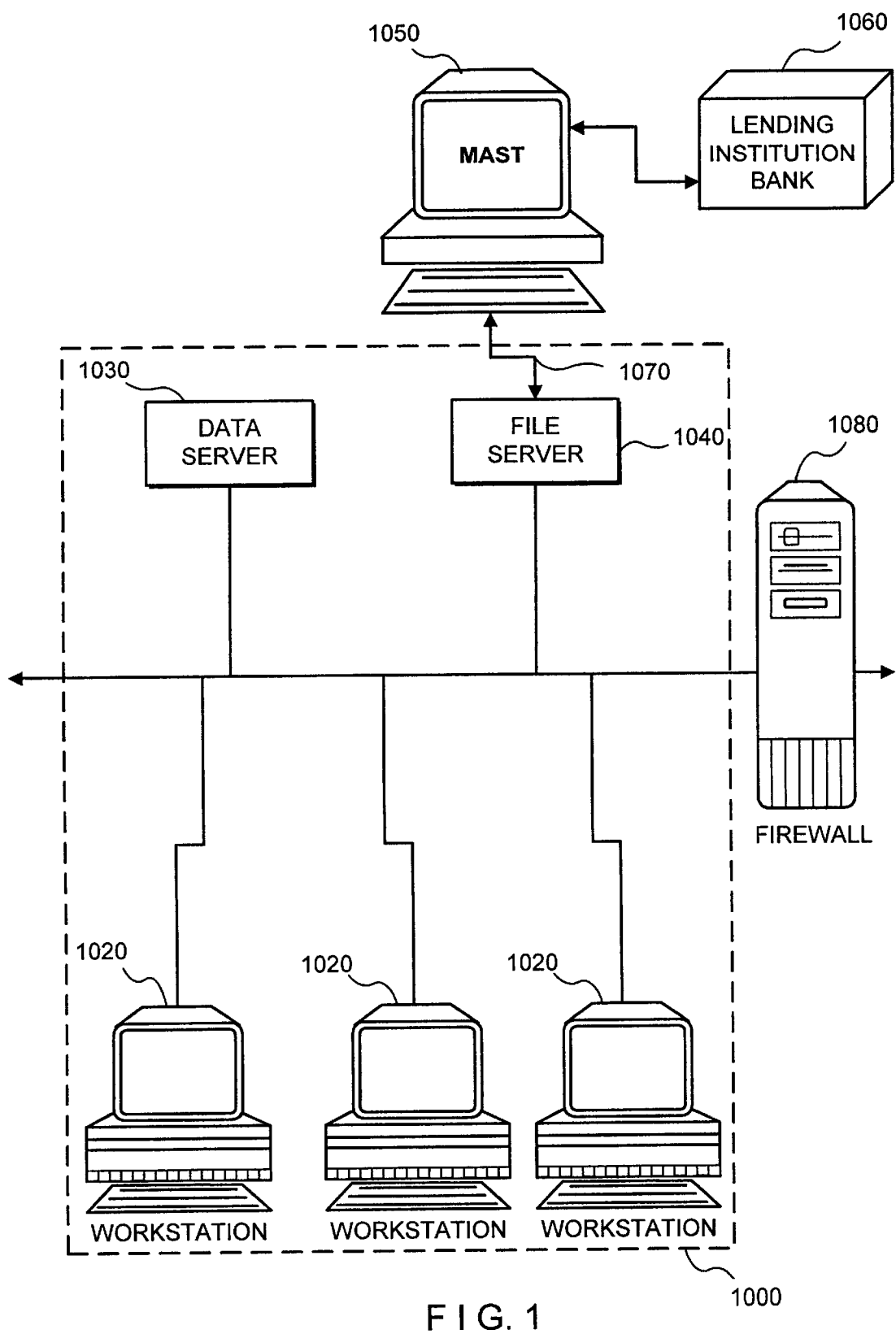
FIG. 1 is a schematic block diagram of the hardware encompassed by the system of the present invention.

Referring now to FIG. 1, a data-processing system 1000 according to the present invention is shown. For purposes of this description, "Lending Institution" will refer to the entity which uses the system of the present invention for processing transactions, regardless of whether those transactions are considered "lending." "Internal personnel" or "officer" will refer to any user of the system within the lending institution, while "customer" will refer to any user outside the institution that may communicate with the system through security procedures described below. "User" will refer to any person currently accessing a particular screen of the system.

While many of the functions of the system are isolated and only functional within the system of the invention, the system is connected to a network 1010 having input/output connections as described more fully below. The network 1010 is also used to interconnect various workstations 1020 of the system for use by internal personnel. A number of workstations 1020 are connected to the network 1010, which also connects to a data server 1030 and a file server 1040. In the preferred embodiment, the two servers 1030, 1040 are Sun SPARC20 workstations running the UNIX operating system. The data server 1030 retains all of the customer data, trade data, and internal financial data (described below). The file server 1040 includes various application modules and submodules for the system of the present invention. Both servers preferably operate a SYBASE database system for storage and retrieval of data. It can be readily seen that other hardware/operating system software combinations will work similarly. For example, the particular database application used is not critical, so long as the data is retrievable as required by the system.

The network 1010 itself is preferably an Ethernet operating in either (or both) of the BANYAN or NOVELL NETWARE environments. In addition to the main network connections, the file server 1040 is connected to Mortgage Asset Securities Trading ("MAST") system 1050, which processes funds transfers to and from the ultimate funds provider, the lending institution's cash bank 1060 (Bankers Trust, e.g.). This connection 1070 preferably uses the known TCP/IP protocol, although others will work similarly. To provide access to the system to customers, the main network is connected through a security "firewall" 1080 between the internal lending institution computers and the outside world. In the preferred embodiment, the firewall uses the SecurID cards of SecurIDynamics, Inc., although the specific security system is irrelevant to the present invention. SecurID cards contain a constantly changing access code that stays in sync with a validator within the firewall server to be accessed. Access can be gained only when the code and validator are in sync, i.e., only when the proper card is used.

The exact configuration of the individual workstations is unimportant, although it is preferred that the minimum configuration comprise a PC with a 486-type CPU, 16 megabytes of RAM, and a 17 inch monitor with a resolution of 768×1024 pixels. The workstations preferably include a graphical user interface, CS/elements from Neuron Data, and a report writer/generator, POWER VIEWER, from PowerSoft, Inc. Various application modules used in the system of the present applications are resident on the workstations' local hard drives. These application modules include Customer Profile, Whole Loans, Funds Transfer, Action Manager and Administration. These modules and their functioning are described more fully below. Workstation configurations for customers are preferably similar, although only a modified Whole Loans module will be installed on customer machines.

Figure 2A:
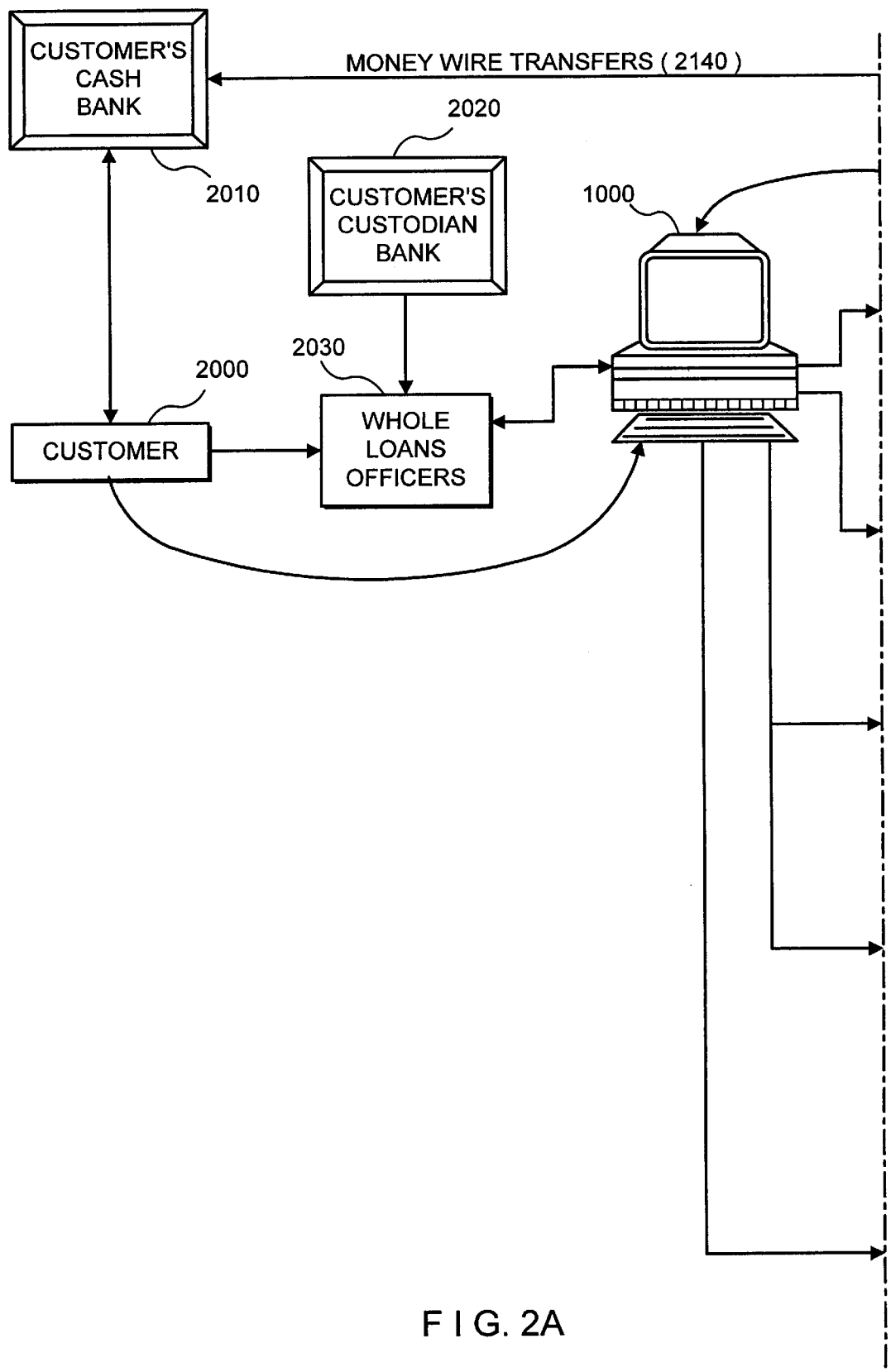
FIG. 2 is a schematic flowchart showing overall functionality of the system of the present invention in relation to the lending institution and its customers.
Figure 2B:
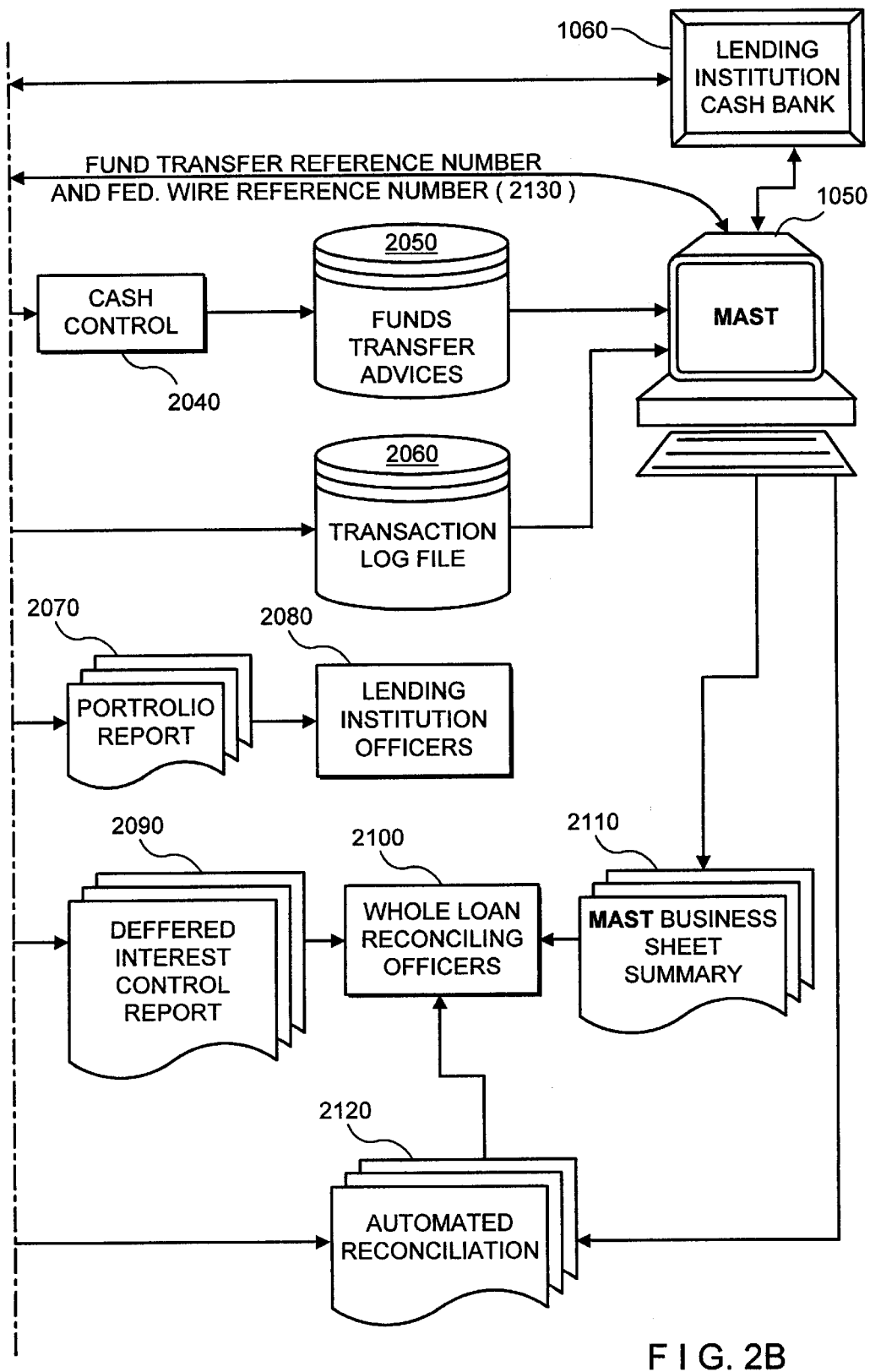

FIG. 2 provides a schematic flowchart showing the relationship of the system 1000 of the present invention to other parts of the lending institution and the outside world. Many of the blocks and actions shown in FIG. 2 will be referenced below in connection with a more detailed description of the processes. These include trade inputs from the customer 2000 directly into the system 1000 and the ultimate generation of wire transfers between the lending institution's and the customer's cash banks (blocks 1060 and 2010, FIG. 2).

Additionally, it is shown that the system is capable of outputting reports for purposes of managerial oversight (2070, 2080) and, in conjunction with MAST 1050, for reconciliation (2090, 2120, 2100, 2110). It is also shown that funds transfer advices sent by the system 1000 to MAST are monitored by internal personnel (block 2040, "Cash Control") and also recorded by the lending institution (block 2050) with other advices generated from other divisions of the institution.

Figure 3B:
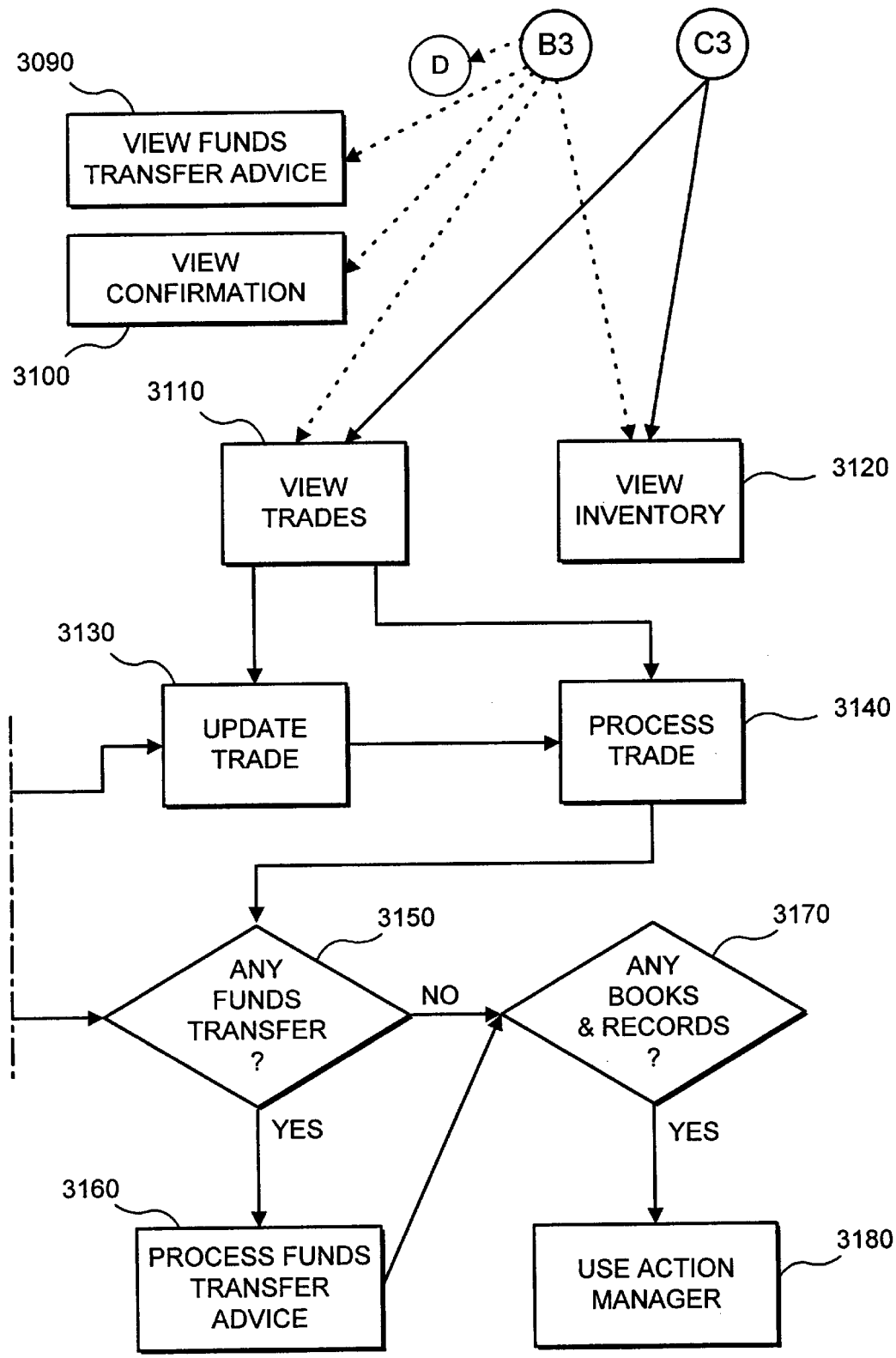
FIG. 3 is an operational flowchart showing access to various functional blocks of the system of the present invention.

FIG. 3 provides an overall functional flowchart of the system of the present invention, including the access points for internal personnel as well as customers. In FIG. 3, there are three basic entrance points into the flowchart. At position A3, a new customer or new trade is entered into the system. At position B3, a customer may gain access to various components of the system to input, view or update data in the system. At position C3, internal personnel perform maintenance operations on the data in the system.

The various functional blocks of FIG. 3 will now be described generally. Many of the blocks will be described in detail with respect to other figures below. At position A3 of FIG. 3, a customer contacts an operations officer within the lending institution by telephone, fax, courier or other standard means and requests that the customer be entered into the system. At block 3010, the officer uses the system to determine if the customer's profile already exists within the system. If not, the new customer's information is gathered by the officer and entered at block 3020 using the Customer Profile module. After the information is entered, or if the customer is already entered, the officer will determine if the transaction is a new trade (at block 3030). If the transaction is a new trade, the officer determines if a Whole Loan file needs to be created at block 3040. If so, the officer gathers the data for the new Whole Loan file and then enters it into the system at block 3050 using the Whole Loans module. If no new Whole Loan file needs to be created, or after the new Whole Loan file is entered, the new trade information is gathered and entered into the system by the operator at block 3060.

If the transaction involves no new trade at block 3030, the officer determines if approval for more or less funding is required at block 3070. If no approval is needed, the system then changes to a screen covering trade updates at block 3130. If approval is needed, the officer may access information about the customer's trades using the monitor trades module at block 3080 to assist in determining whether the funding will be approved.

At point B3, the customer may access the system, assuming the customer has passed successfully through the firewall, using the Whole Loans module (see connection between blocks 2000 and 1000, FIG. 2). At block 3090, the customer may view data related to any funds transfer advices that have been issued in connection with that customer's trades. At block 3100, the customer may view confirmation of any of the trades previously entered.

At all times, the Administration module within the officer's workstation (or the modified Whole Loans module for customers) determines whether the data that is displayed on any workstations, internal or external, may be altered by that particular user. In many instances, customers will only be able to view data that officers may alter. In such situations, the Administration module will only allow editing functions to be displayed or functional when an officer is accessing the data. Specific examples of this will be described more fully below.

At block 3110 of FIG. 3, the customer may view trades. From point C3, it can be seen that the internal personnel can also view trade information at block 3110. However, the system will only allow the customer to view his trades, while the internal personnel may view any trades and/or alter trade information.

The customer may also view the inventory information relating only to his trades at block 3120. If the customer needs to change any trade information at any point, e.g., to request more funds, he can immediately change to a screen covering trade updates at block 3130, or he may update the information after viewing at block 3110. The Whole Loans module will allow the customer to change his own data as described more fully below.

At position C3, the officers can access the system to perform any routine maintenance/monitoring tasks that are necessary. The officers may view trades or inventory, at blocks 3110 and 3120, respectively. After reviewing trade information, officers may update trades at block 3130 by altering the trade data to conform, for example, to internally-approved parameters. The officer may also authorize the trade at the Process Trade block 3140. The Administration module will check that the officer has the authority to authorize a trade, which will then be processed according to the institution's protocols.

After a trade has been processed or updated (blocks 3140, 3130 and 3080), the system determines if any funds transfer is necessary at block 3150 as a result of the trade. If so, the system will process a funds transfer advice at block 3160 according to the customer's bank instructions as entered in the customer's profile. This may result in a funds wire transfer between the lending institution's cash bank and the customer's cash bank (see 1060, 2010 and 2140, FIG. 2). If no funds transfer is needed, or after the advice has been processed, the system will determine if any information must be recorded in the institution's Books and Records ("B&R") at block 3170. If so, the Action Manager module will be activated at block 3180 to process and transmit over the network the necessary instructions to the appropriate other computers on the network. If not, the user is free to begin again another task, e.g., view trades, view inventory, etc.

Figure 4:
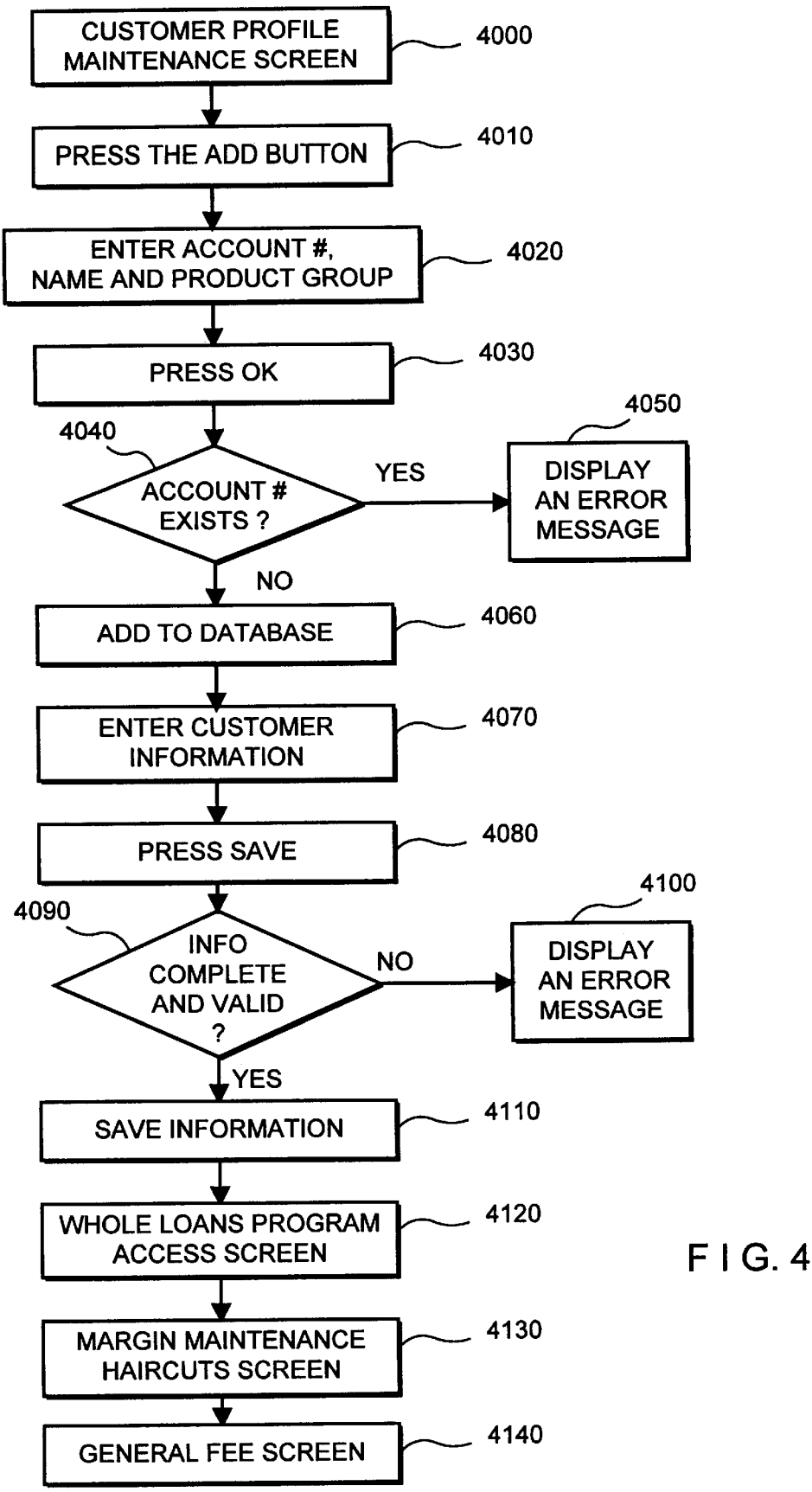
FIG. 4 is a functional flowchart for entering a new customer into the system of the present invention.
Figure 4A2:
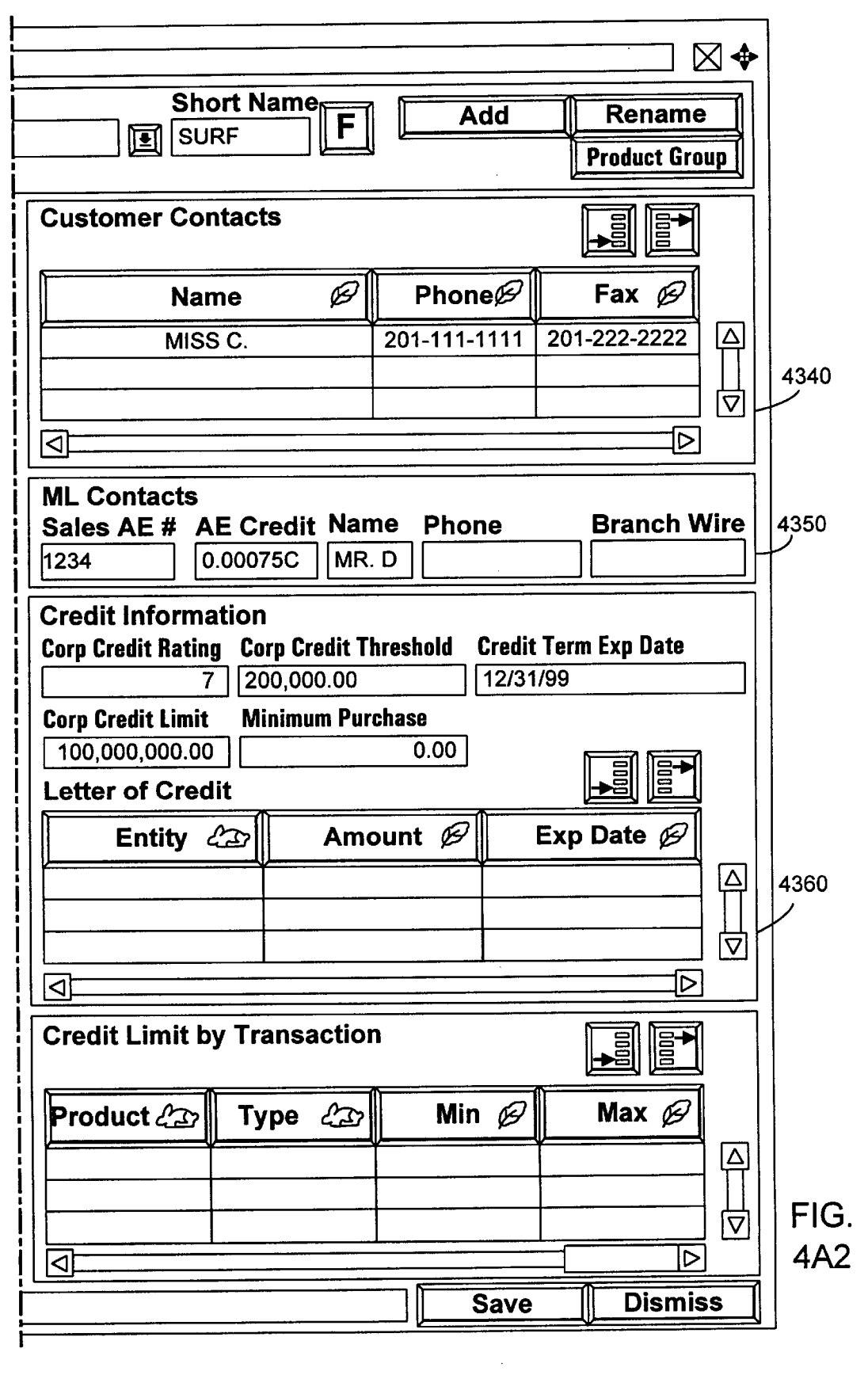

Referring now to FIG. 4, a schematic flowchart for entering a new customer into the system (functional block 3020 of FIG. 3) is shown. From within any open screen, the user may select Customer Profile Maintenance from a drop-down menu (block 4000). Once selected, the Customer Profile module will be initiated and a screen as in FIG. 4a will appear. After pressing the Add button on the screen (block 4010), which will call up a blank form, an officer will enter the new account number (assigned by the lending institution), the customer name and assign a product group (block 4020). Product groups refer to any division within the lending institution involved in whole loan trades. After pressing the OK button (block 4030), the system will access the data server and compare the new account number with existing account numbers (block 4040). If the account number already exists, an error message will be displayed (block 4050) and the officer will be prevented from saving duplicate numbers. If the account number is new, the system will record the new account number, customer name and product group in the database held on the data server (block 4060). The maintenance screen may then be completed by the officer (block 4070) by querying the customer (see connection between blocks 2000 and 2030, FIG. 2) for the various information needed. The information is separated into blocks for convenience and readability, as follows:

Account Information: (block 4300)
    Account # (assigned by lending institution)
    Customer Name
    Short Name Customer information: (block 4310)
    Address
    Tax ID
    Parent Company
    Industry Type Custodian Bank Default Currency Funds Transfer Wiring Instructions: (block 4320)

Line Code (a name given to the set of instructions)

ABA Number

Bank Name, City, State

Account #

Beneficiary Name

Legal Agreements: (block 4330)

Customer Contacts: (block 4340)

Lending Institution Contacts: (block 4350)

Credit Information: (block 4360)

The specific items listed above are merely illustrative. Any items desired by the particular lending institution may be included on the form. Once all the information has been entered, the officer presses the Save button (block 4080), which causes the computer to initiate an error-check on the data to determine if all of the required information has been entered (block 4090). It is up to the lending institution to determine the minimum information necessary to process a customer. If critical information is missing or in an improper format, an error message is displayed (block 4100) and the form remains on the screen to be completed (process flow returns to block 4070). If the information is complete, the information is saved to the data server (block 4110) for future use and reference.

On many of the screens of the system, users are given the opportunity to save the entered/updated data using the Save button. Although it will not be described with respect to every such screen, it is to be understood that should any errors occur during the saving process, such as a miscommunication over the network, an error message will be displayed for the user that the save was unsuccessful.

If desired, after the initial account number and customer name have been entered and accepted (block 4060), the officer may exit the screen without completing the remaining information. This will reserve the account number for that customer and prevent any other customer from being entered into the system with that account number. The officer would later return to the screen to complete the information as needed.

FIGS. 4b, 4c and 4d show three additional forms that must be selected and filled out by the officer once a complete customer profile has been entered. FIG. 4b shows the Whole Loans Program Access screen, which will allow the officer to select which particular programs of the lending institution will be available to that customer (block 4120). In block 4400 of FIG. 4b, the account number and customer are displayed. Block 4410 first displays all of the available programs and issuers/private investors. By selecting one of the programs or issuers, it will automatically appear in the Accessible Programs area. Block 4420 displays specific attributes of any programs selected.

By way of example, two of the programs listed in FIG. 4b will be described. The Financing Prepooled program is a popular program using a reverse repurchase agreement ("reverse repo"). In this program, a customer pledges collateral such as mortgage loans and other assets in return for funds. The customer also agrees to "repurchase" the pledged collateral at a later date for the principal loan amount plus interest. In the EPP ("Early Purchase Program") Agency Securities program, by contrast, the lending institution actually purchases the mortgage loans or assets from the customer. However, the purchase is only made if the lending institution has a future commitment from another source (perhaps a different department of the lending institution) to purchase the loans or assets at a set future date for a fixed amount. This program assists customers in managing their balance sheets.

It is to be understood that in addition to transactions in which the lending institution provides funds to a customer in return for collateral, the system of the present invention is also used for transactions in which the lending institution is borrowing funds from another institution. In such a situation, the lending institution is pledging whole loans as collateral for the funds. Further, there is no "customer" directly connected to the system of the present invention, as with the reverse repo, for example.

FIG. 4c shows the screen for "Margin Maintenance Haircuts," which is only accessible to internal personnel (block 4130). "Haircut" is the industry term for the discount applied to the offered collateral that is assessed in determining the amount of funds offered in return. As seen on the screen of FIG. 4c, block 4500 contains the account number and customer name. Block 4510 displays when the list of haircuts was last updated and by whom. Block 4520 displays the period in which no margin call will be made if the pending trade is within that period. Block 4530 contains a list of the various types of collateral that might be offered by a customer, such as mortgage loans and bonds. As shown by the quill pen in the two "haircut" columns, the officer may manually alter any or all of the haircuts, depending on information received from the appropriate department (e.g., credit department) within the lending institution. Once entered, the officer hits the Save button to record the various haircuts for that customer in the database on the data server. These haircuts are later automatically retrieved when needed for calculating trades, as described more fully below.

As seen on FIG. 4c, some fields on the system screens have quill pens in them, while others show a mouse. Those fields with quill pens are manually entered by the user. Fields with mice are selected from a drop-down menu using the workstation pointer device (such as a mouse). The various screens of the system also provide access to other screens through drop-down menus located in the upper left corner of each screen.

FIG. 4d shows the General Fee screen accessed at block 4140 of FIG. 4. This screen is only accessible by internal personnel. In general, this screen allows the lending institution to input how and when any interest or fees will be paid by the customers. Using the information entered in this screen for all customers, the system can provide the lending institution with an accurate projection of future income/loss at any time.

In FIG. 4d, block 4600 contains the usual account number and customer name. Block 4610 contains instructions for any reinvestment of either the customer's or the lending institution's interest. Block 4620 displays the period of interest remittance and the actual timing (e.g., which day of the week), the interest is remitted. Block 4630 includes the default calculation method to be used by the system to calculate the interest due. Block 4640 lists information on any bonds borrowed for a certain type of "Bonds Borrowed" transaction. Block 4650 lists any structuring fee required as part of the trade. Block 4660 shows cutoff times during the day for certain customers to either increase their level of funding or to pay down some of their outstanding debt.

Figure 5A:
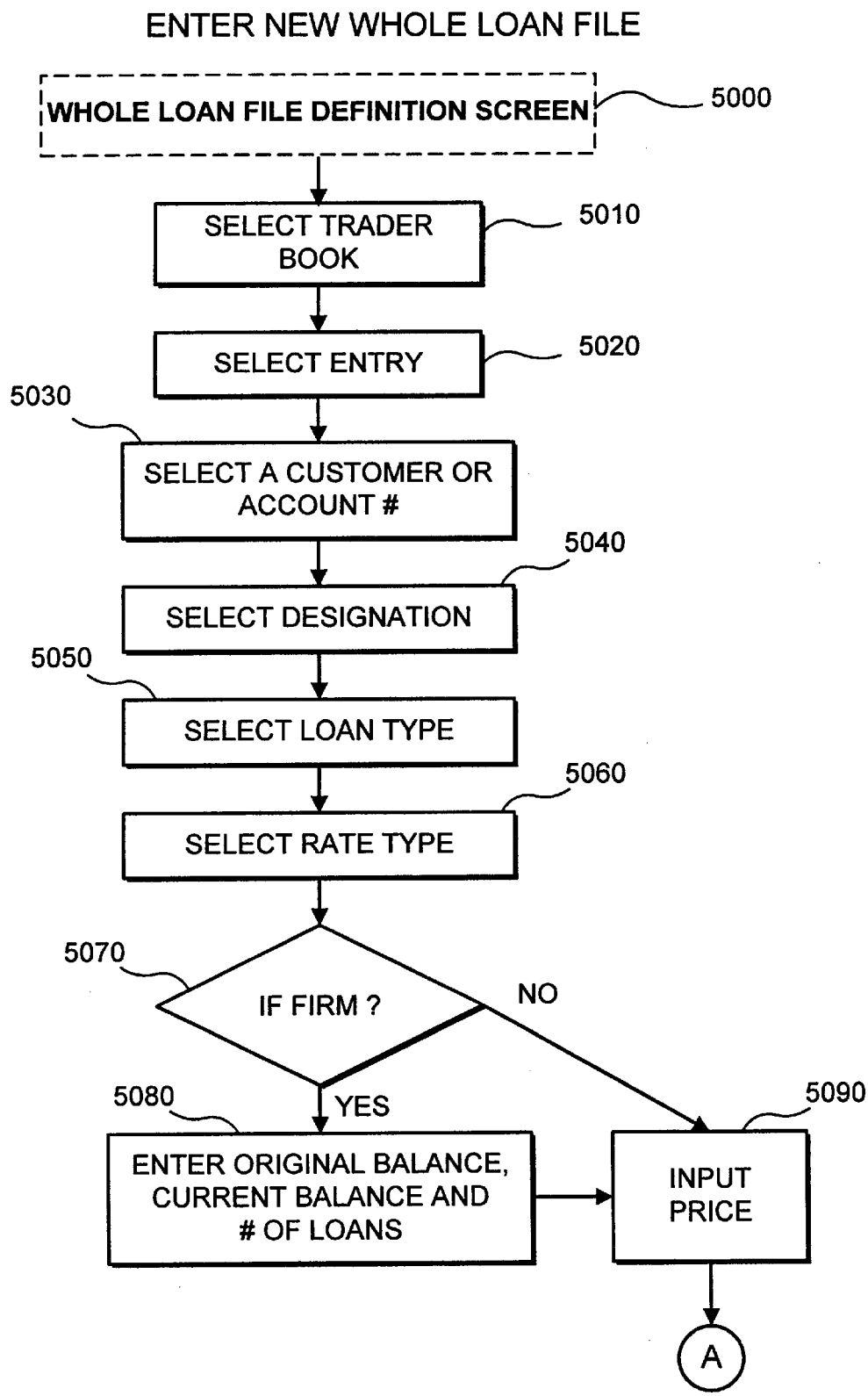
FIG. 5a is a Whole Loan File Definition screen of the present invention.

Referring now to FIG. 5, a functional flowchart is shown for the process of entering a new Whole Loan file into the system, represented at block 3050 of FIG. 3. The Whole Loan module is initiated and the Whole Loan File Definition screen is brought onto the screen using the drop-down menus of any open screen (block 5000). The Whole Loan File Definition screen is shown in FIG. 5a, and will be discussed in conjunction with the flowchart of FIG. 5.

Initially, information concerning the parameters of the loan are entered into block 5300 of FIG. 5a. The Trader Book is selected (block 5010), preferably between "matched book," in which the lending institution borrows the collateral against its loan, and "firm" in which the lending institution owns the collateral against its loan. The entity within the lending institution that is funding the loan to the customer is then selected at block 5020.

The officer then inputs the customer name or account number at block 5030. Depending on which one is entered, the system will access the data server, search for the customer's profile and fill in the other item. The system will also retrieve and display the Custodian field information from the customer's profile. At block 5040, the designation of the collateral, such as "conforming" (meaning that the collateral may be securitized) or "non-conforming" is selected from a pull-down menu using the arrow beside the field (see block 5300). Depending on the entry in the Designation field, the Private Investor and security Description fields will be enabled or disabled. The type of loan being offered as collateral must also be input (block 5050), as well as the requested rate type, such as fixed, adjustable or mixed (block 5060). Once the customer, designation and loan type are entered, the system will automatically access the customer profile on the data server to retrieve the haircut margin that matches those parameters. The margin is then automatically displayed within block 5300 of FIG. 5a.

At block 5070, the system determines if "matched book" or "firm" was selected for the trader book. For transactions entered by a customer, only "matched book" may be selected. If "firm" was selected, then "original balance," "current balance" and "# of loans" of block 5310 will remain empty and will be entered by the officer (block 5080). If "matched book" was selected or after the information is entered in block 5080, the officer enters the price (block 5090), which is a percentage value used by the system to compute the market value of the loan. The default value for price is 100.

Functional blocks 5100–5130 represent input of various optional information, depending on the needs of the lending institution. At block 5100, private investors or security description information is entered as appropriate. At block 5110, a pool number (such as the pool number assigned by an outside agency, e.g., FannieMAE) or a commitment number (a temporary number assigned until a pool number is available) is entered for the particular assets offered. At block 5120, the coupon or coupon range is entered, if applicable. At block 5130, the Gross and Net WAC (weighted average coupon) and WAM (weighted average maturity) and the LTV (loan-to-value ratio) are entered. It is contemplated that the system may calculate the Gross and Net WAC and WAM and the LTV if all the required information for the various collateral loans for that customer is entered into the system.

Once the form is complete, the officer presses the Save button (block 5140), which initiates an error-check of the data by the system to determine if the necessary data has been entered (block 5150). For example, for a "firm" trader book whole loan, the system will determine if the "original balance," "current balance" and "# of loans" fields have been entered. If not, or if any other necessary information is missing or in improper format, the system will display an error message (block 5160) and maintain the definition screen on display to be completed. It is also contemplated that for "firm" whole loan files that include multiple loans, a field will contain a list of the existing loans for the officer's rapid review and information. The necessary fields on the form may be determined by the lending institution and customized to meet its internal policies and external regulations.

If all of the necessary data has been entered, the system will generate a unique whole loan file with its own number (block 5170). This file and its data will be saved to the data server by the system for future reference and a message will be displayed indicating that the file has been successfully saved (block 5180).

At any point in the future, the information in the whole loan file may be updated. After accessing the Whole Loan File Definition screen, an officer may enter any whole loan file number, in field 5330 in this case. If the file exists, the system will populate the definition form with the retrieved data associated with the file number. The officer can then make any changes, and then press the Save button (block 5150), which will again initiate the data check sequence to determine if any essential information has been omitted (blocks 5160–5180).

FIG. 5b is a Whole Loan Inventory screen used by internal personnel and customers to review existing whole loans. Customers only have access to their own loans and are unable to change the parameters of the loans. Various loans may be displayed on the inventory page by selecting them using the Generic Filter module. The Generic Filter module and associated screen may be accessed from various screens to cause only selected files or loans to be displayed on the screen.

Once loans are displayed on the inventory screen, detailed information may be obtained on any of them by highlighting the row containing the loan and pressing the Details button (button with a magnifying glass icon). This will cause the system to display a Whole Loan File Definition screen populated with the data for the highlighted trade. The user may then select from the File History, Price History or Factor History buttons (see area 5320, FIG. 5a). The price may also be updated by internal personnel to keep the market value up-to-date. It is also contemplated that the system will automatically review the loan inventory and alert internal personnel when any pre-determined criteria is satisfied, such as the impending maturity of an asset. Real-time information related to the various items of collateral may also be automatically updated by downloading the information from the custodian banks on a periodic or as-needed basis. The system is also capable of making aggregate determinations, such as collateral turnover rate, that were previously impossible with paper-intensive methods.

FIG. 5c is a Whole Loan File History screen, accessed from drop-down menus or from the Whole Loan File Definition screen button, which allows internal personnel to view all actions that have taken place with respect to a single whole loan file. As can be seen from the screen, once the particular whole loan file is selected (using the Generic Filter module), the columns of the screen are either retrieved from the data server or calculated by the system based on retrieved data.

Figure 6A:
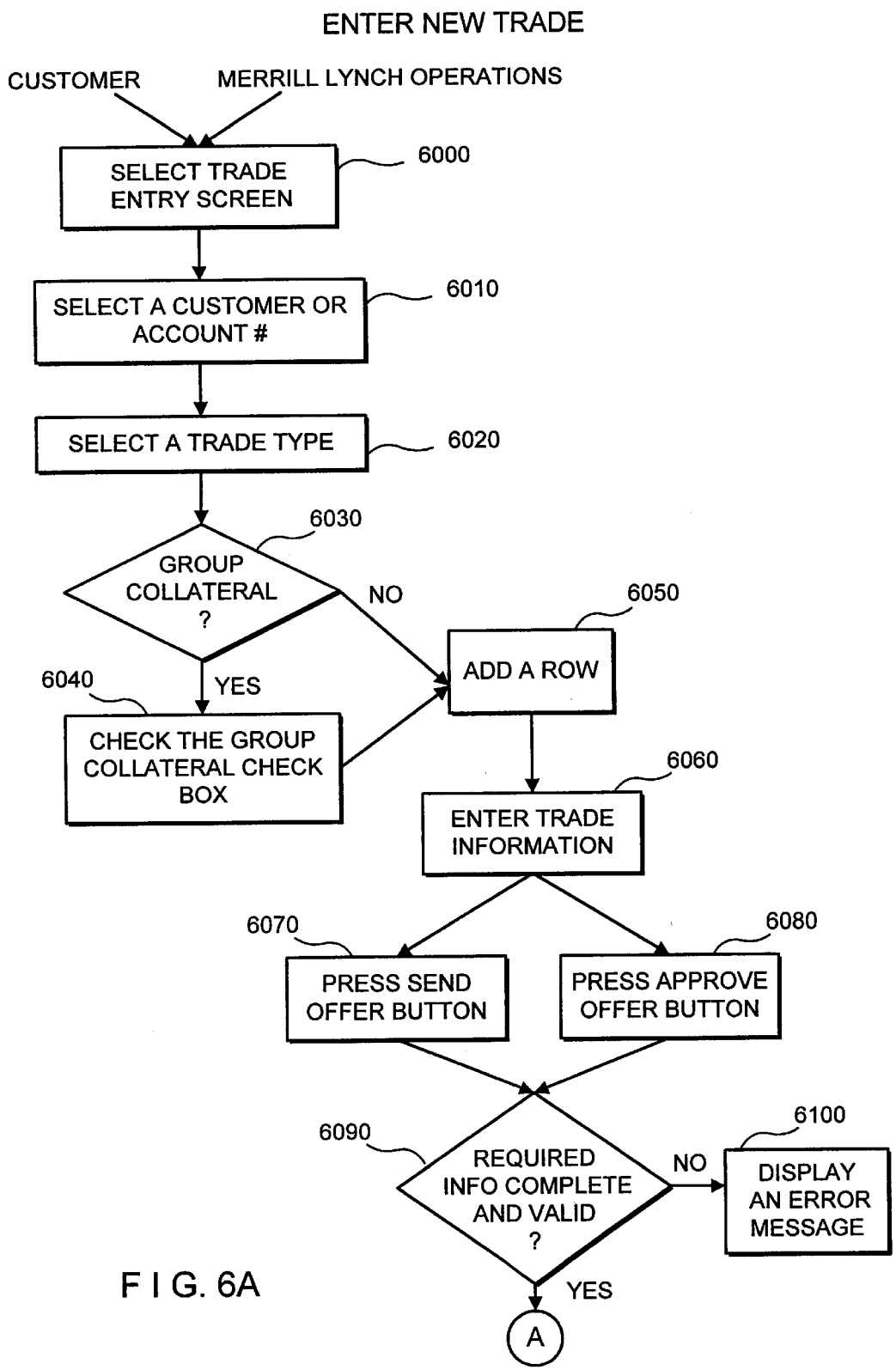
FIG. 6a is an example of a trade entry screen of the present invention.
Figure 6B:
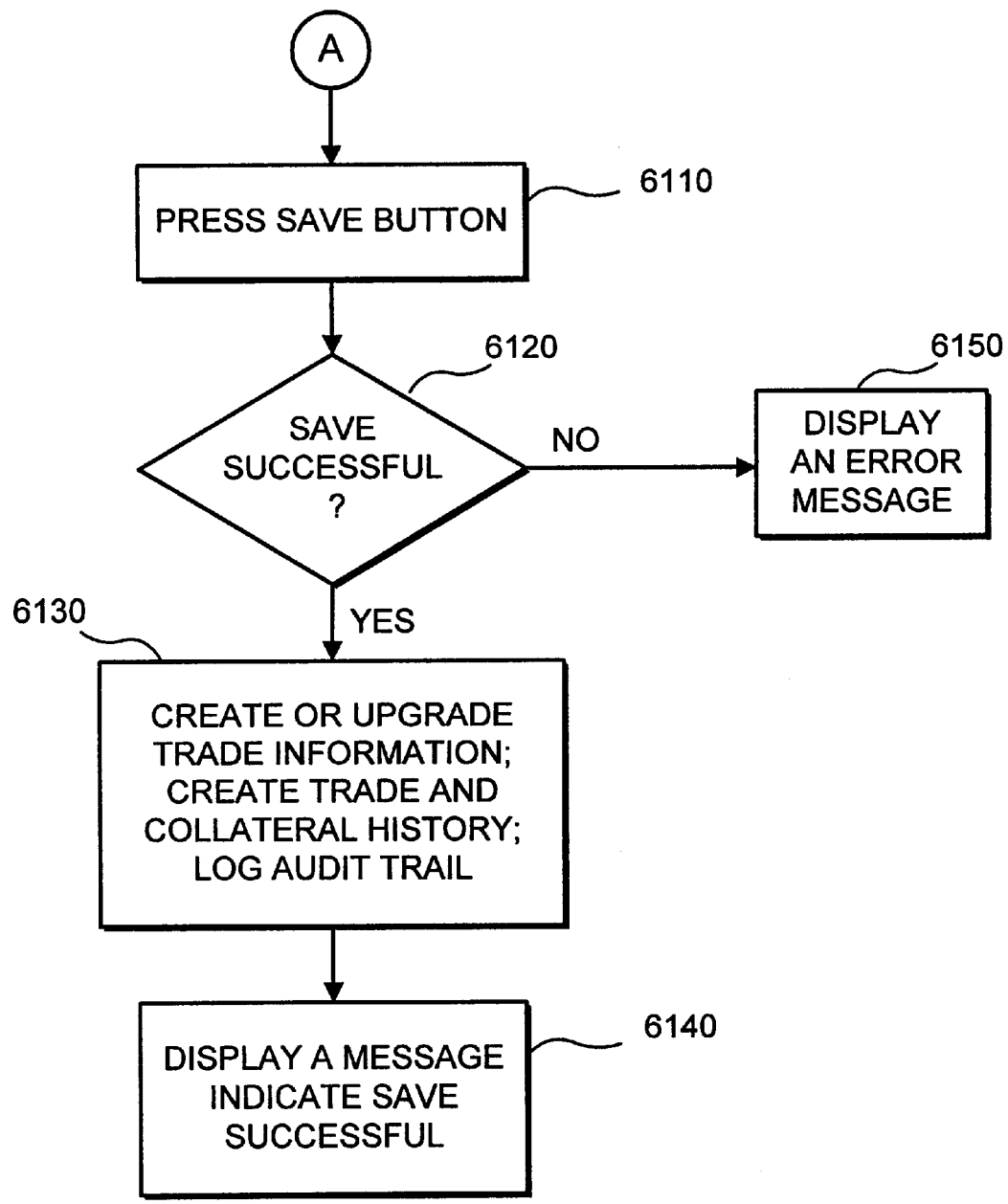
FIG. 6 is a functional flowchart for entering a new trade into the system of the present invention.

Referring now to FIG. 6, a schematic flowchart relating to the entering of new trades into the system is shown. Both customers and internal personnel have access to the trade entry screens, although the Administrator module limits the functionality of the screens to customers, as described more fully below.

To begin entering a new trade, a customer or officer selects a trade entry screen from the drop-down menus based on the particular program the trade will use (block 6000). For the customer, only those programs that he has access to will appear on the menu. As an example, "Financing Prepooled" (which is one of the industry standard programs) has been selected. FIG. 6a shows a Financing Prepooled trade entry screen.

Once the screen is displayed, either a customer name or account number must be entered (block 6010), which will be then displayed at block 6300. Assuming the customer exists, the system retrieves information such as the Program Limit, Program Limit Used and the Program Limit Remaining from the customer profile stored on the data server (block 6310). The Trade Type field is also populated with the various programs in which the customer is authorized to participate, allowing the user to select the trade type desired (block 6020).

The user must then decide if he wants to group several trades having different collateral information into a single trade transaction (block 6030). Grouping collateral has several effects. If collateral is not grouped, each trade will be given a separate row with a separate trade reference number within block 6330 of FIG. 6a. If the user chooses to group the collateral by checking the group collateral box in block 6320 (functional block 6040, FIG. 6), the various sub-trades will be grouped together with a single trade reference number. In the preferred embodiment, when collateral is grouped, the various subtrades must have identical entries in the following categories: Start Date, End Date, Margin, Rate, BI (Bank Instructions) Flag, Line Code, Trade Date and Entity. Each lending institution will be able to select the appropriate categories that must be matched when collateral is grouped. To guarantee that the categories will be matched, the system only allows entry into these categories in the first row of block 6330, which is the first-entered subtrade of the grouped collateral. These categories are then automatically copied from the first row to the remaining subtrades. In this manner, significant time and effort is eliminated, since the users can work with the various subtrades as a single trade, while complete trade information is stored and maintained for each subtrade. The system also guarantees that the information that needs to be matched among the group sub-trades is actually matched.

Regardless of whether the collateral is grouped or not, the system will add a row in block 6330 for entry of new trade information (block 6050). The Aggr Original Balance, Aggr Funding Amount and Aggr Maximum Financing Amount fields will display the running totals of the Orig. Prin. Bal., Aggr Out Bal. and Maximum Fin. Amount columns, respectively, in the entered trade. This will allow the user to immediately determine if any maximum amounts have been surpassed. Once a row has been added, it may be deleted using the Delete button, but only before the information in the row has been saved. Once a row is saved, the system disables the Delete button for that trade.

When a row is added, the system will automatically populate the Trade Date (the business day the trade is entered), Entity and default Line Code (name given a set of bank instructions) fields, based on information stored in the customer profile on the data server. Depending on which Line Code is selected, the system will also populate the corresponding Bank Account number and Bank Name fields. The remaining information must be entered or selected by the user (block 6060) or calculated by the system based on further entries.

In the preferred embodiment, Designation, Loan Type and Rate Type are populated with pull down menus containing the available choices. Purchase Price is the amount the customer is requesting. The Pricing Rate is determined by the index and haircut stored in the customer profile, along with the current rates for the corresponding business day. Purchase Date is the date the trade actually takes place. Repurchase Date is the date the trade is scheduled to end. The Maximum Financing Amount is calculated by the system by multiplying the Aggr Out Bal., Collateral Price and Margin. The Margin is retrieved from the customer profile based on the selected program and collateral type. The BI Flag, which can be set to BI or NOBI, allows the user to choose whether to send Bank Instructions for the trade (for example, bank instructions are not sent when trade information is updated, but no funds transfer takes place). The Line Code may be selected from those stored in the customer profile.

Trade Status is the current status of the trade displayed. When a trade is initially entered, its status is Open. Once an officer approves the trade, the status becomes Approved. Once data from the custodian bank arrives certifying the collateral for the trade (see blocks 2020 and 2030, FIG. 2), the status becomes Matched, at which point the funds transfer may take place. It is contemplated that the custodian bank information will be electronically transmitted to the lending institution in response to an electronic query by the system, thus automating the certification process (represented by dotted line between blocks 2020 and 1000, FIG. 2).

The Entity field is the entity within the lending institution that is specifically involved in the trade. The WL (Whole Loan) File # field is generated by the system and assigned to a specific piece of collateral. The whole loan file is created by internal personnel (see FIG. 5 and corresponding text). On the trade entry screen, when a WL File number is entered, the system automatically populates the collateral information on the form. The Ref. # field is a system generated number assigned to a specific trade, with the first six digits preferably being the trade date.

It is to be understood that depending on the lending institutions particular recordkeeping requirements/needs, the particular fields necessary for entry of a trade might be different than those shown for the preferred embodiment.

Once the trade information is entered, the trade must be processed. For the customer, only the Send Offer and Rollover buttons will appear in area 6340 of FIG. 6a. The remaining buttons will be functional only for internal personnel. A customer will process a trade by pressing the Send Offer button (block 6070, FIG. 6). The dotted line from block 6060 to block 6070 indicates that the customer will not have access to the Approve Offer button (block 6080). An officer, after reviewing the trade information, may press the Approve Offer button (block 6080).

Regardless of whether the Send Offer or Approve Offer button is pressed, the system will initiate an error-checking routine on the trade data (block 6090). The system will check to ensure that the trade reference number generated is unique and does not already exist in the database. For Approve Offer, the system will check that the status was Open before the button was pressed. The system will also check if the entered information is complete and valid (for example, the Pricing Rate valid range is preferably 0.000001 to 99.999999). The system will also check to make sure that no limits are exceeded (for example, that Credit Limit Used does not exceed the Credit Limit or the Aggr. Funding Amount does not exceed the Aggr. Max. Fin. Amount). If any errors are found, an error message will be displayed (block 6100).

If no errors are found, the system will display a message asking the user to save the trade, which is accomplished by pressing the Save button (block 6110). Once the button is pushed the system will attempt to verify that the save was successful (block 6120). If the save was unsuccessful, the system will display an error message (block 6150). Upon successfully saving, the system will create or update the trade information in the database, create trade and collateral history entries, log an entry to the audit trail (block 6130), and display a message that the save was successful (block 6140).

Trades can also be updated or processed at a time after the initial entry. If the trade information is still on the trade entry screen, the information may be updated on the same screen and then saved by pressing the Save button. This initiates a further error-checking routine, which in addition to the checks performed above with respect to block 6090, also includes a check that the trade is current (by checking an internally stored trade version number) and that the trade status is not Canceled, Released or Repurchase Settled (since all three of these are considered terminated trades). Upon saving, in addition to saving the information discussed above with respect to block 6130, the system will update the internal trade version number and change the trade status to Updated if there is any funding or collateral changes.

Figure 8A:
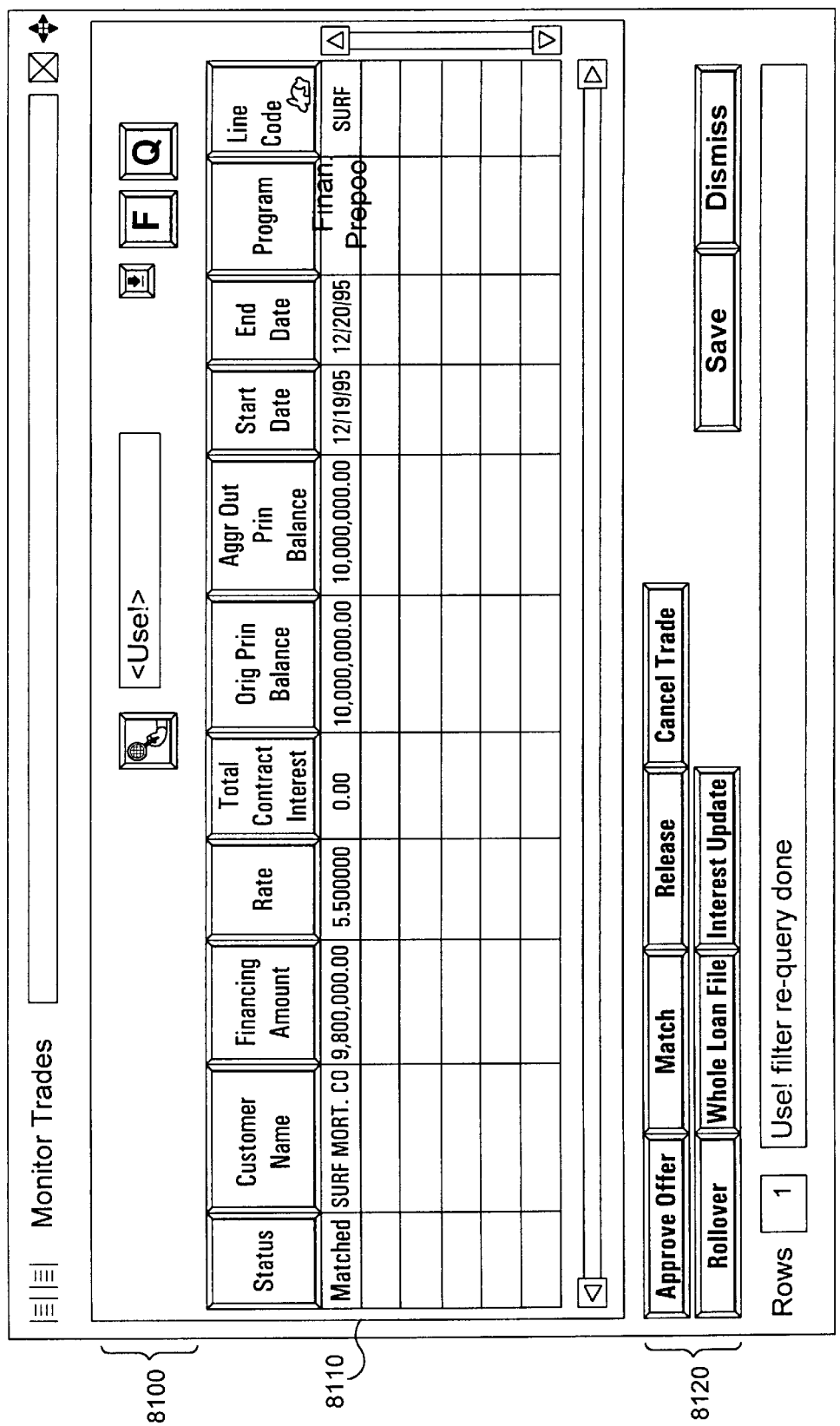
FIG. 8a is a Monitor Trades screen of the present invention.

If the particular trade to be modified is not shown on a trade entry screen, the user can get to a trade entry screen through the monitoring screens. Customers would select a Trade Summary (see FIG. 8*b*) screen from the drop-down menus, while internal personnel would select a Monitor Trades screen (see FIG. 8*a*). Using the Generic Filter, the trade to be updated is selected, causing the system to populate the screen with the appropriate trade listings. By highlighting the desired trade and then pressing the Detail button, a Trade Entry screen will appear with the complete trade information populated on the form. The trade information may then be updated as described above.

In addition to being updated, trades may also be further processed after the initial entry. Once the trade is open in a trade entry screen (either by remaining in the trade entry screen or through a monitoring screen as discussed immediately above), an officer may press any of the trade process buttons, such as Approve Offer, Match, Release, Rollover, Cancel Trade, Reclaim, Partial Release. Once the button is pressed, the system initiates an error checking routine similar to that for updating trades. If there are no errors and the user presses the Save button, the system preferably:

Updates the trade version number
Updates the trade information
Changes the trade status
Updates the customer confirmation (described below)
Updates the interest information
Sends a message to the Action Manager module to create any necessary Books and Record entries
If necessary, creates a Funds Transfer advice and sends it to the Funds Transfer Module to await approval
Creates trade and collateral history entries
Logs audit trail
Displays a message to indicate the save was successful Referring now to FIG. 7, a schematic flowchart of the functional logic relating to funds transfer monitoring and processing is shown. Funds transfer monitoring and processing functions are only available to internal personnel. Customers may gain access to much of the information related to the funds transfers through their access to the Trade Summary screen. FIG. 7*a* shows a Funds Transfer Monitor screen (block 7000), from which internal personnel may see an overview of all Funds Transfer advices, including their histories, and may process advices as well.

Using the generic filter, the officer selects the desired advices, which the system then retrieves and displays (Block 7010). The selection field in area 7200 allows the user to show only trades having a certain status, for example, only Pending trades as shown in FIG. 7*a*. Once selected, the funds transfer advices are displayed in box 7210 of FIG. 7*a*. The officer may then highlight any trade which he desires to view in detail or process (block 7020). To view in detail, the trade is highlighted and then the Detail button (the button with a magnifying glass icon in area 7200) is pressed. The system then displays a Funds Transfer Detail screen as shown in FIG. 7*b* containing the details of the transfer. From within the Funds Transfer Detail screen the official may update the Federal Wire Reference number, the Funds Reference number, the Funds Transfer advice status, and the Line Code.

Referring to FIG. 7*a*, the Total Net Change field in box 7210 displays the difference of the total of all outgoing advices and the total of all incoming advices displayed on the screen. By pressing the Funding button within area 7220 of FIG. 7*a*, the officer may cause the system to display a Funding Monitor screen (see FIG. 7*c*). The Funding Monitor screen will allow the officer to view the aggregate balances of Funds Transfers and the Total Funding needs of the various bank accounts used by the lending institution for the programs linked to the system of the present invention. History information may also be displayed by the system in the Funding Monitor screen by entering a previous date, rather than the current one.

Figure 7:
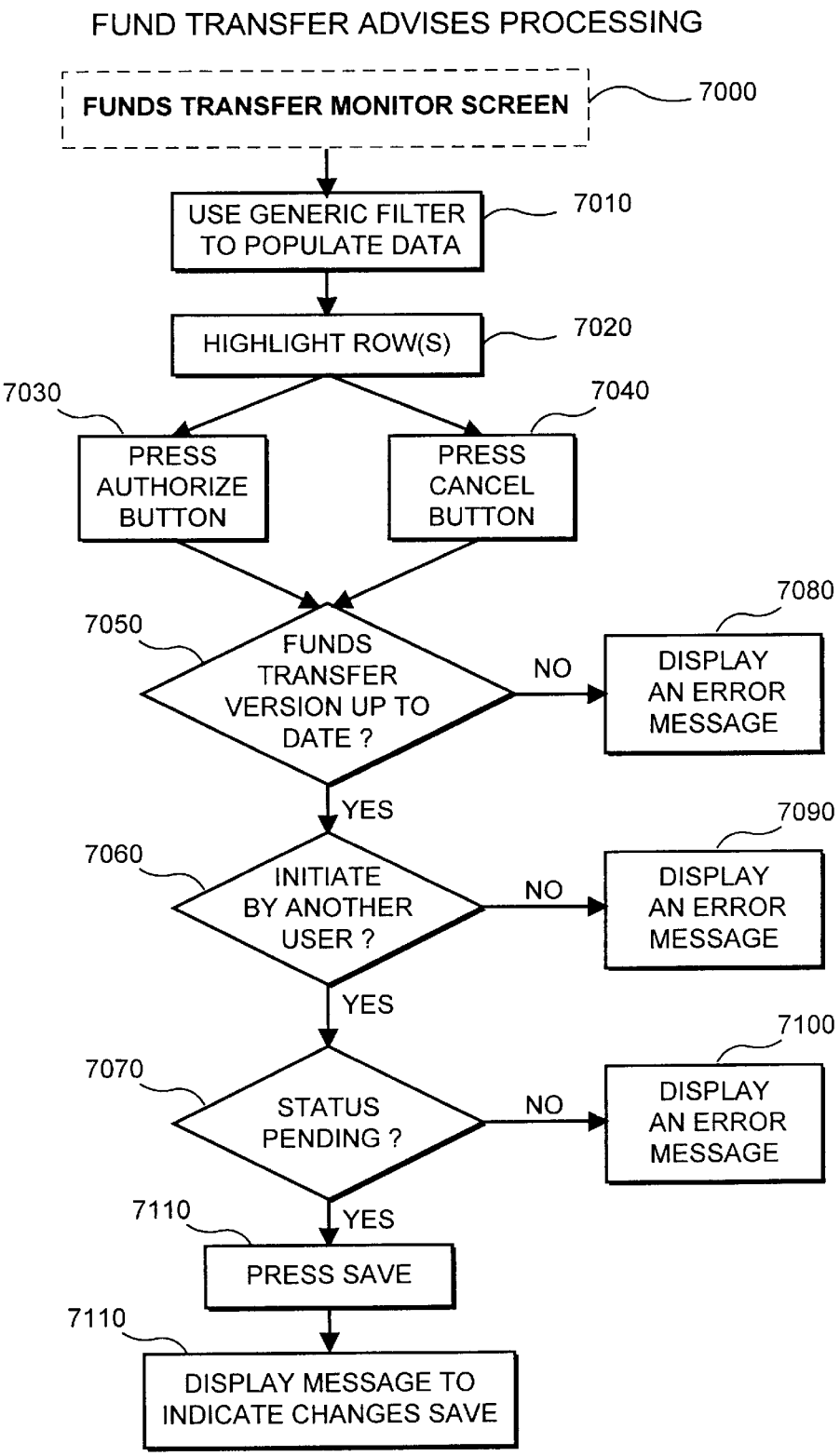
FIG. 7 is a functional flowchart for processing funds transfer advices using the system of the present invention.

Two key processing functions for the officer are the Authorize button and the Cancel button, both found in area 7220 of FIG. 7*a* and both represented by functional blocks 7030 and 7040 of FIG. 7, respectively. To authorize an advice, the officer highlights the desired advice and presses the Authorize button (Block 7030). The system will then initiate an error checking routine, which will first check if the Funds Transfer version is current (Block 7050), since another officer might have already authorized or canceled the advice. Each time the system alters the data in a trade, the version number is increased. If the version is current, the system checks to ensure that the officer who authorizes the advice is different than the officer that initiated it (Block 7060). Assuming that the integrity and security of officers' passwords is not compromised, this provides a fraud-proof method of requiring two officers to approve any advice. Previous paper security methods, such as requiring two signatures, could be easily compromised. The system will also check that any advices authorized have a Pending status (Block 7070), since only Pending advices may be authorized.

If the system detects error conditions at any of the three checks (Blocks 7050, 7060, and 7070), an error message will be displayed for the user (Blocks 7080, 7090, and 7100, respectively) and the advice will remain on the screen. If no error states are detected, the officer will be prompted by the system to press the Save button (Block 7110), which will result in the advice being saved with an Authorized status. A message will also be displayed informing the officer of the successful save (Block 7120).

Pressing the Cancel button (Block 7040) with an advice highlighted will produce similar processing to when the Authorize button is pressed. The system will initiate a similar error checking routine, except the system will not check if a different officer initiated the advice. The same officer may cancel the advice. Assuming the other error conditions (not current version and not pending—Blocks 7050 and 7070) are absent, the system will save the advice with a Canceled status, preventing another user from authorizing the advice.

Other functions and screens may also be accessed from the Funds Transfer Monitor screen. Pressing the Create button (an arrow icon inserting a row—see area 7200 of FIG. 7a) causes the system to display a blank Create Funds Transfer screen (see FIG. 7d), which may then be filled in manually by the officer. It should be noted that no actual funds transfer will take place unless the advice is authorized by a different officer.

The Line Codes button in area 7220 of FIG. 7a provides access to the Line Codes screen. Line codes are the names given to a set of bank instructions for a particular piece of collateral. Within the Line Codes screen, any information within the line code may be updated. The Funds Nettable Flag may also be set on this screen. When the Funds Nettable Flag is set, the system will automatically combine multiple advices to or from the same custodian bank into a single advice. An officer may also authorize a line code by confirming that the funds transfer wiring instructions for the code are correct.

Figure 7E:
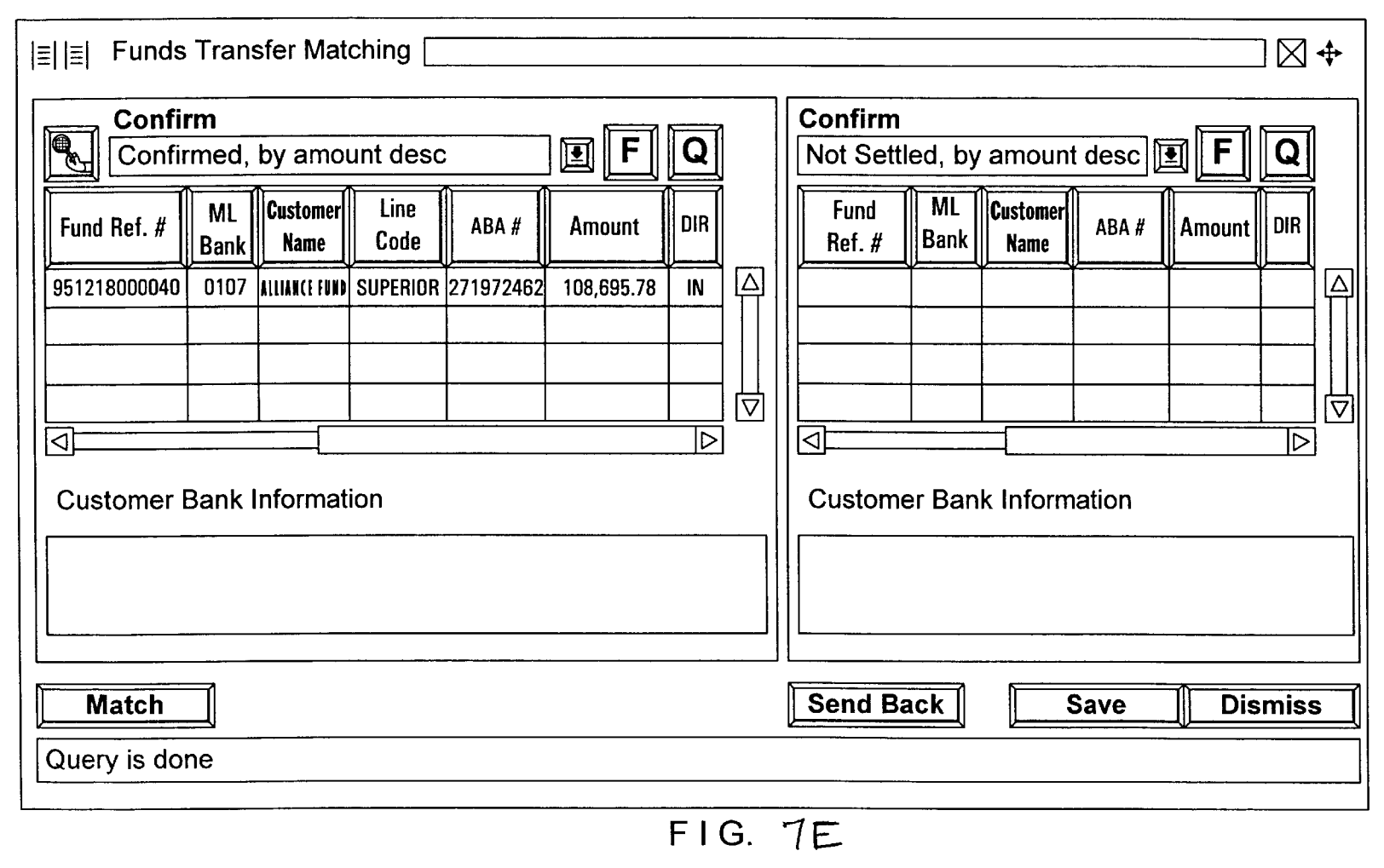

The Matching button in area 7220 of FIG. 7a causes the system to display a Funds Transfer Matching screen (see FIG. 7e). On the left hand side of the screen, confirmed advices created by trades (which have been authorized by an officer) are displayed. On the right hand side of the screen, pending funds transfers are displayed. By highlighting an advice and one or more of the pending funds transfers, followed by pressing the Match button, the system will initiate an error checking routine. The system will first determine if the advice and the unmatched funds reference the same lending institution bank, ABA (bank) number and customer bank account number. If so, the system will determine if the difference between the advice and the unmatched funds is within a predetermined tolerance range. If the difference is greater than the range, the system will alert the officer and give the officer the opportunity to confirm the match anyway. If the references match and the difference is in the proper range, the status of the advice and the funds transfer will be changed by the system to Settled and the status of the associated trades will be updated.

The Funds Transfer Matching screen also allows authorized officers to bounce back incoming funds triggered by an advice. This may be necessary if funds are incorrectly transferred to the lending institution. By highlighting the row containing the funds the officer wishes to bounce and then hitting the Send Back button, the system will prompt the officer to confirm the Send Back. If the officer confirms and then presses the Save button, the system will generate a message through the Action Manager (described below) to the lending institution's asset management system (e.g., MAST) to create an opposite direction funds transfer notice to the lending institution bank.

Figure 7F2:
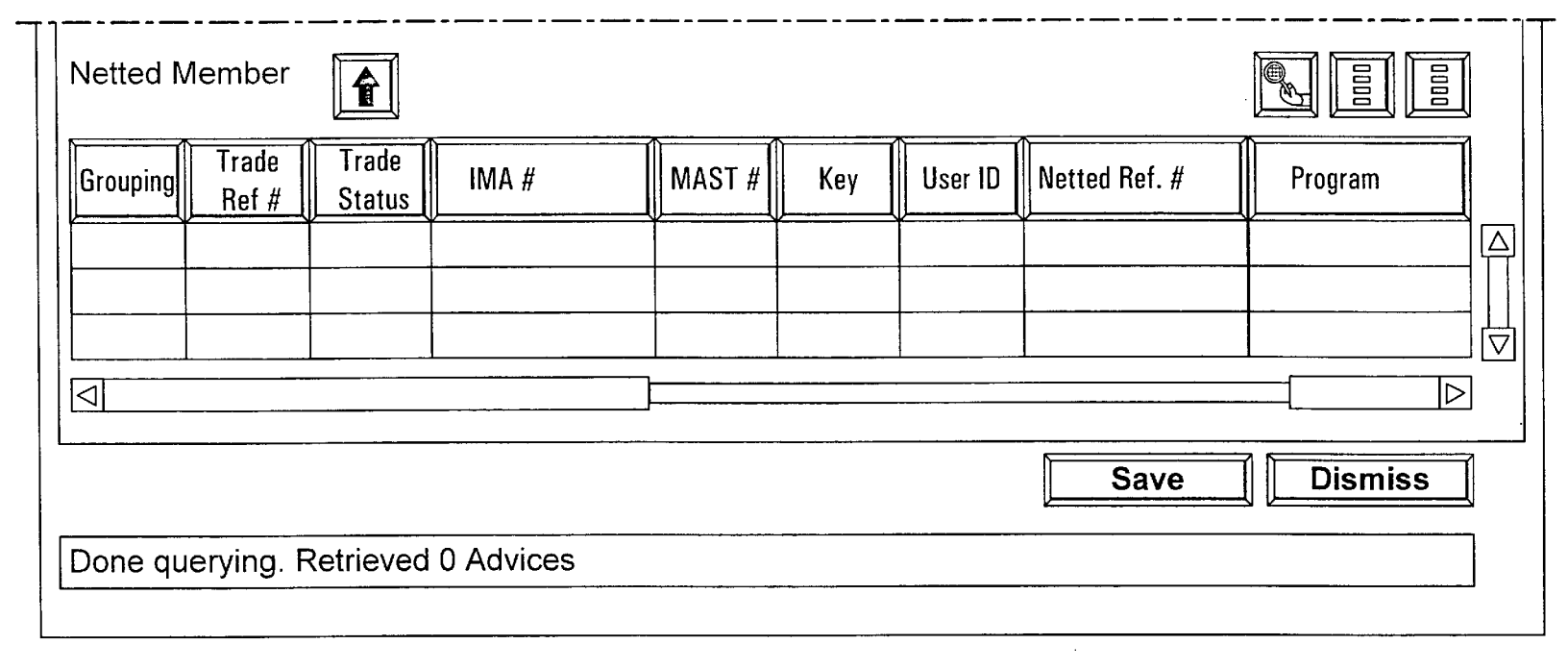

Another function available from the Funds Transfer Monitor screen is "netting," available by pressing the Netting button in area 7220 of FIG. 7a while funds transfer advices are selected within box 7210 of FIG. 7a. Pressing the button will cause the system to first determine if the Funds Nettable Flag has been turned on in the selected customer's profile. If so, the system will display a Funds Transfer Netting screen (see FIG. 7f). As seen in FIG. 7f, box 7300 displays the selected customer information and the current date. A selection field is also shown to allow only trades having a certain status to be displayed.

In box 7310 of FIG. 7f, pressing the Net button (a down-arrow icon) will cause the individual advice displayed in the box to be transferred to the netted advice area in box 7320. The various netted members (trades) that are included in the netted advice will be displayed in the netted members section of box 7320. Netted advices and netted members can be un-netted (split into individual advices) by pressing the respective Un-net button (up-arrow icon) within box 7320 of FIG. 7f.

Both internal personnel and customers are able to monitor trades at any point, although different screens are used by each type of user. Internal personnel select the Monitor Trades screen from drop-down menus, causing the system to display a blank Monitor Trades screen (see FIG. 8a). From this screen, internal personnel can perform various tasks related to the maintenance and processing of existing trades (block 8100). Using the generic filter, the officer can select any existing trades for display. To make sure that officers are approving only the proper funding requests, each separate transaction related to a single trade is displayed on a separate row. For example, if the customer initially requested 10,000,000 dollars at 9:30 a.m., but then increased the request to 12,000,000 at 10:30, the trade would be listed as a request for 10,000,000 in one row and then an increase of 2,000,000 in the second row. The trade would not be listed as a single request for 12,000,000. In this way, the customer can not change the request at the last minute while the officer is in the process of approving the first request. The officer would need to approve both requests individually. After both have been approved, they are then stored as a single trade. By contrast, as will be seen below, if the customer views the pending offer, he will see it as a single updated request for 12,000,000.

Once displayed in box 8110, the details of any trade can be displayed by highlighting the row with the desired trade and pressing the Detail button. The system would then display the appropriate Trade Entry screen depending on the type of trade and would populate the fields with the trade information retrieved from the data server. To display details about the collateral for a specific trade, the officer presses the Whole Loan File button in area 8120, which causes the system to display a Whole Loan File Definition screen with that trade's information. The system also checks that the trade has only one Whole Loan File number. If a trade has more than one File number, meaning that more than 1 piece of collateral is associated with the trade, the system will not automatically display the Whole Loan Definition screen, but will instead display an error message to the user.

Pressing the Interest Update button will cause the system to display an Interest Updates screen (FIG. 8e), which will allow the officer to manually update any interest information for the highlighted trade. It is contemplated that the system will have access to real-time interest information through the network and will automatically update interest information, according to a predetermined schedule.

The Approve Offer button (area 8120) allows an officer to approve an open funding request by highlighting the row with the trade and pressing that button. Upon pressing the Approve Offer button, the system will initiate an error-checking routine. The system will check the trade version number to make sure it is the most current, followed by a check of the Trade Status, which must be Open for the trade to be approved. If there are no error conditions, the officer will be prompted to save the information. If the save is successful, the system increases the trade version number, changes the trade status to Approved, creates a trade history entry, sends a message to the Action Manager and logs an entry into the Audit Trail.

An officer can also match an approved funding request by highlighting the approved funding request and pressing the Match button in area 8120. Initially, the system will check that the trade version number is current and that the Trade Status is Approved. If not, an error message is displayed. If there are no errors, the user is given the choice of setting the Bank Instructions flag to BI (bank instructions) or NOBI (no bank instructions). IF BI is selected, a message is displayed informing the user that a funds transfer advice will be sent if the Save button is pressed. If NOBI is selected, the user is informed that no funds transfer advice will be sent and is asked to confirm before saving.

Once the matched transaction has been saved, the system will perform the following:
Increase the trade version number
Change the trade status to Matched if BI is selected or Purchase Settled if NOBI is selected
Create a trade history entry
Send a message to the Action Manager
Send a funds transfer advice if BI is selected
Update the customer inventory
Send a log entry to the audit trail If the trade is an "as-of" trade (the start date is before the current date), calculate back interest from the start date to the current date.

The Release button in area 8120 is used by an officer to terminate a trade. By highlighting the desired trade in box 8110 and pressing the Release button, the system will perform the following error checks: the trade version number is current, the trade status is Matched or Purchase Settled, and the End Date of the trade is the same as the current date (trades can only be terminated on the end date). If any error conditions are present, an error message is displayed. If not, the user is given the choice of setting the BI Flag as described immediately above with respect to the Match button.

After the user saves and the save is successful, the system will:
Increase the trade version number
Change the Trade Status to Released if BI is selected or to Repurchase Settled if NOBI is selected
Send a message to the Action Manager
Send a funds transfer advice if BI is selected
Update (decrease) the customer inventory
Update the confirmation
Reconcile the trade interest
Create a trade history entry
Log audit trail The Cancel Trade button in area 8120 allows an officer to cancel a trade that has not yet been terminated. Once the Cancel Trade button is pressed, the system will initiate an error-checking routine for the following states: the trade version number is current, and the trade status is not Canceled, Released, Repurchase Settled or Rolled (which are all considered "terminated"). If both of these states are present (no error) and the trade status is either Matched or Purchase settled, the system will give the officer the opportunity to set the bank instructions as with the Match and Release buttons described above. If there is no error and the trade status is Open or Approved, the system will prompt the user to save.

If the save is successful, the system will perform the following tasks on the trade information:
Increase trade version number
Change trade status to Canceled
Send a message to the Action Manager
Send a funds transfer advice if BI is selected
Update (decrease) the customer's inventory
Update the customer confirmation
Reconcile the trade interest
Create a trade history entry
Log audit trail The Rollover button allows an officer to continue a trade at its end date. By highlighting the desired trade and pressing the Rollover button, the system will check for the following data states: the trade version number is current, the trade status is Matched or Purchase Settled, and the end date is the same as or later than the current business date. If there is no error, the officer will be given the choices of (a) combining the remaining trade interest with the principal amount for the new trade, (b) paying out the remaining interest, or (c) storing the remaining interest to the new trade. Once the user has made a selection, the system will display a trade entry screen (see FIG. 6*a*) with the old trade information but without a Rate, End Date, Trade Ref. #, or Trade Status. The officer must then enter the new Rate, End Date and update any other fields, similar to functional block 6060 of FIG. 6.

Upon approval, similar to block 6080, the system will perform its error checking routine (Block 6090). If the save is successful, the system will perform the following operations:
Increase the trade version number
Change the old trade's status to Rolled and the new trade's status to Purchase Settled or Updated.
Send a message to the Action Manager
Send a funds transfer advice if officer selected to pay out the remaining interest
Update the customer confirmation
Reconcile interest for the old trade
Create trade history entry
Log audit trail Unlike the Monitor Trades screen, which provides internal personnel with a wealth of functionality to update and process trades, the Trade Summary screen accessed by customers only provides a means of viewing the information, without being able to affect it. The Trade Summary screen (see FIG. 8*b*) may be accessed from the drop-down menus available to the customer. The system will automatically display the total purchase price per program type and the total aggregate balance (box 8200, FIG. 8*b*). The customer may then populate the display box in box 8210 by using the generic filter and entering any appropriate selection criteria. As with other screens, highlighting a trade and pressing the detail button will cause the system to display the appropriate trade entry screen (depending on the program type) with the latest trade information populated on the screen.

Figure 8B:
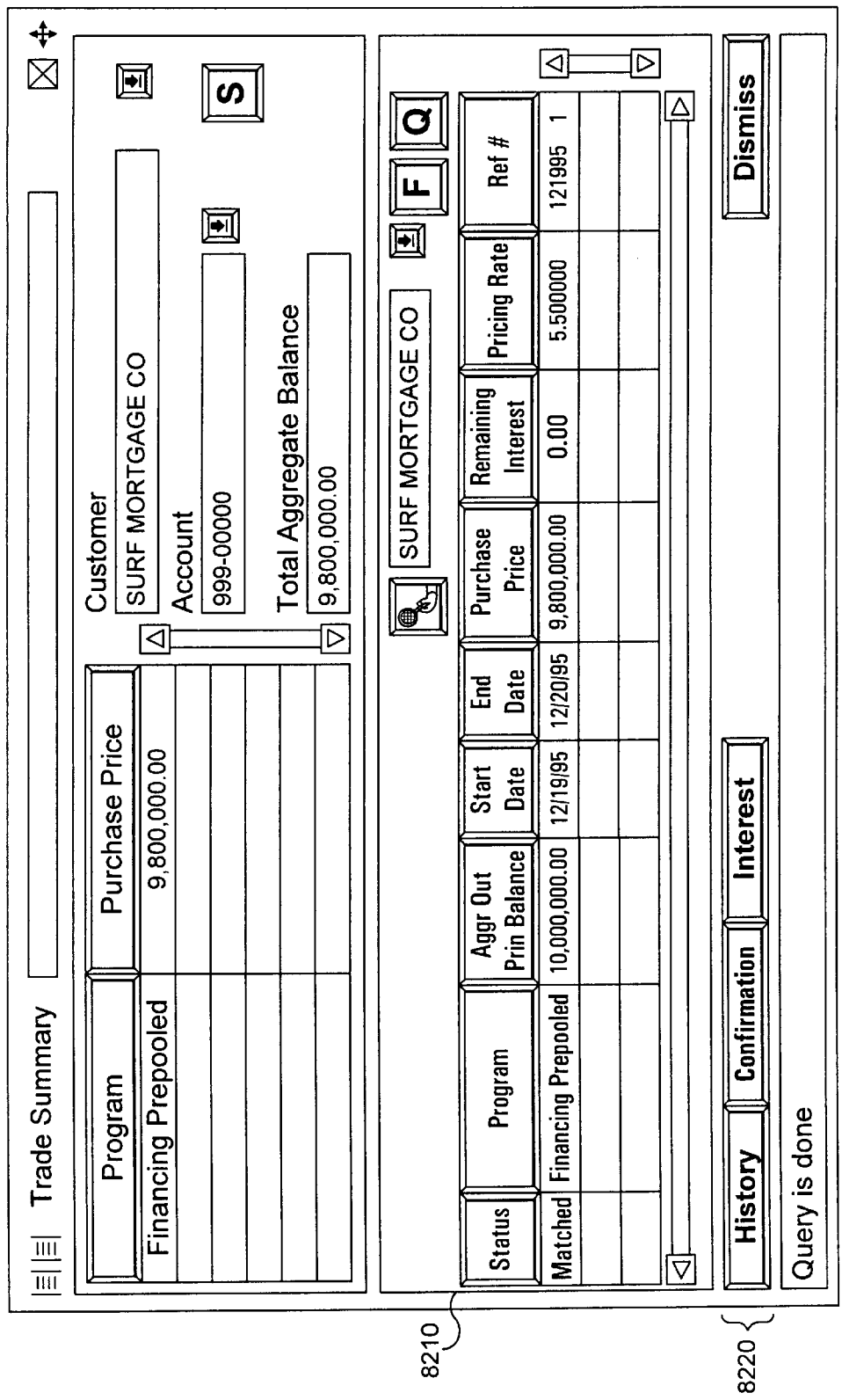
FIG. 8b is a Trade Summary screen of the present invention.

The customer may also see the history of any trade by highlighting it and hitting the History button in area 8220 of FIG. 8*b*. This causes the system to display a Trade History screen (see FIG. 8*c*), which will show a list of all transactions that have occurred (e.g. approval or certification) for the trade. Using the Confirmation button will cause the system to display a Confirmation screen (see FIG. 8*d*), providing an overall summary of the trade. Using the Interest Update button will cause the system to display an Interest Updates screen (FIG. 8*e*), showing the interest information for the selected trade.

Referring now to the Action Manager module, various modules of the system, such as the Whole Loan File module or the Customer Profile module, send messages to the Action Manager module when some task outside of the particular module needs to be performed. These messages contain an object, which is the item, such as data, that is to be affected, and an event, which is the specific task to be performed.

Within the Action Manager, there are various submodules that perform specific tasks. First the Action Manager Listener continuously polls the database for incoming messages to the Action Manager from outside of the system that have not been processed. Once a message is found that has an Open status, the Listener grabs the message and invokes an "action group" to process the message. Preferably, Action Groups consist of B&R actions, which end up affecting the lending institutions financial records at another node of the network, or COM actions, which consist of messages sent to other portions of the system of the present invention, or other computers throughout the lending institution network. Once a message to the Action Manager has been processed, the Listener changes the status of the message to Completed.

Second, the Action Manager is preferably comprised of a Server submodule, which scans the Action Manager's queue table to find Action Groups that have been invoked by the Listener and need to be processed. The Server then retrieves the Action Group and its associated parameters and changes the status of the Action Group to In Process. The server then loops through all the actions in the group until the action requested by the message is found and that action is performed.

Third, the Action Manager is preferably comprised of a Link submodule, which sends and receives messages over the network to other systems within the lending institution, as well as any outside financial institutions, such as custodian banks or the lending institution's cash bank. For example, in response to a funds transfer advice, the Link submodule would send a request to MAST to transfer funds with the appropriate bank instructions. In return, Link would receive the Federal Reference Number from MAST acknowledging the transfer (see block 2130, FIG. 2).

As an example of overall operation of the Action Manager, the Whole Loan module would transmit a message over the network such as—AM_InvokeActionGroup("WL Repo", "Cancel", "tradeRefNum")—. In such a message, "WL Repo" is the object, "Cancel" is the event, and "tradeRefNum" is the parameter. It is to be understood that the specific programming language used to implement the entire system, and thus, the type of syntax for commands, is not critical to the present invention so long as the logic and result are similar. When a module sends a message, it inserts a row into the action group queue. The Server submodule, scanning the queues, reads the "WL Repo", "Cancel", and "tradeRefNum" with its Open status and invokes the appropriate action group. In response to this message, the action group is programmed according to the particular database format in use to alter the data on the data server. The end result is that the data table on the data server containing the data for the trade with the particular trade reference number will be altered so that the trade status is Canceled.

In configuring the Action Manager and its various components, it is necessary to identify all of the actions that may take place and enter them into the system according to action group and action type. This is accomplished through various screens available only to internal personnel.

Figure 9A:
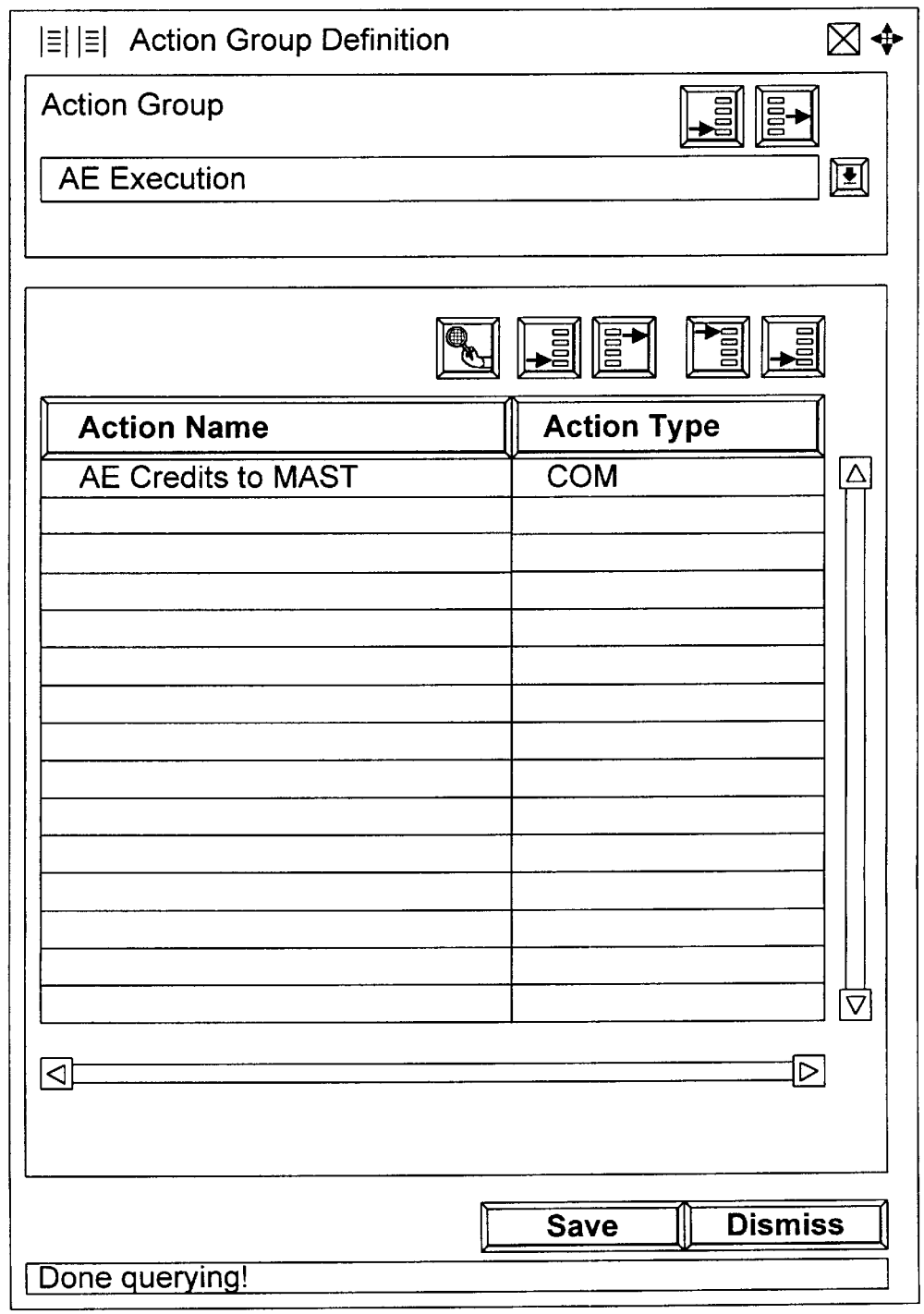
FIG. 9a is an Action Group Definition screen of the present invention.

The officer may modify which actions are associated with a particular Action Group using the Action Group Definition screen (FIG. 9a). Buttons are available for adding or deleting an entire action group, or for modifying an existing group by selecting it from a pull-down menu. For an Action group selected, the system will retrieve from the data server the data table containing all of the actions associated with the selected group and then display those actions along with the type of action. The details of any action may be displayed by highlighting the action and pressing the Details button. Depending on whether the action is a COM or B&R action, the system will display a definition screen as in FIG. 9b or FIG. 9c.

Referring now to FIG. 9b, the details of a single COM action "AE Credits to MAST" (see box 9210) are shown. A COM action essentially consists of a message sent over the network messaging system. The header information is contained within box 9220 of FIG. 9b and includes the message format, the system module originating the action and the destination of the message. The body (see box 9230) of the action, and thus, the body of the message to be sent, consists of various fields, each having a "Tag" description, a field value and a field length. Above the listing of the various fields, there are buttons for inserting, deleting or re-ordering the fields of a particular COM action.

Referring now to FIG. 9c, a B&R Action Definition screen is shown displaying the details of the "Cancel & Correct Repo" action (see box 9310). The contents of the action (box 9320) essentially provide instructions for entering debits and credits the appropriate lending institution ledger accounts, including the particular book, amount and "as of" entry date. Box 9310 includes buttons for adding or deleting an entire action, while box 9320 includes buttons for adding, deleting or modifying the order of individual instructions within the action.

Referring now to FIG. 9d, a Placeholder Definition screen is shown. Placeholders are used by the Action Manager as definable variables. It allows a programmer to insert the Placeholder, for example, as one of the fields in a COM action, without having to input the entire SQL definition for the placeholder. As a result, whenever the placeholder appears within an action to be executed, the system will execute the SQL statement and the resulting data will be substituted for the placeholder within the action as executed.

Figure 9F:
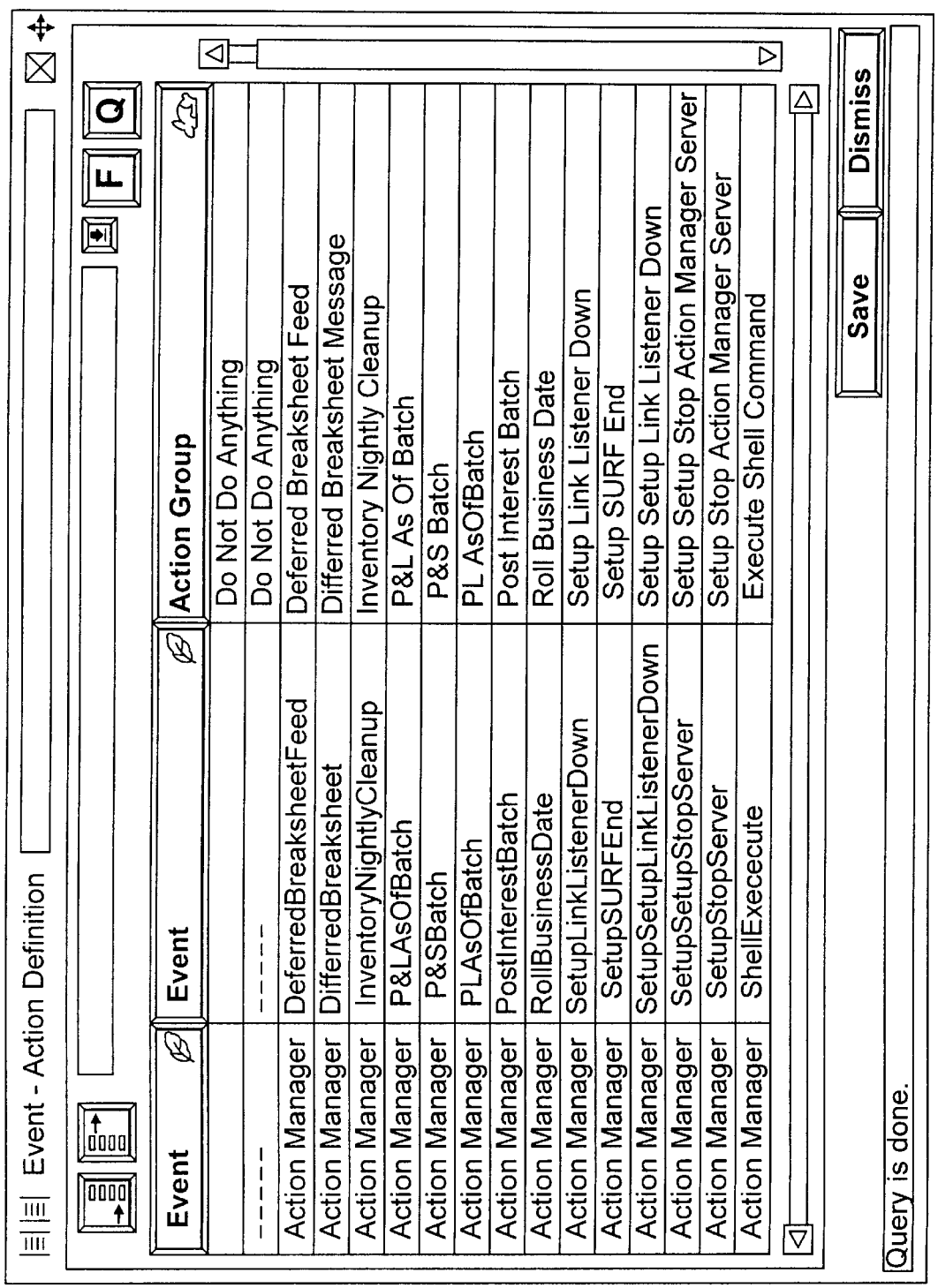
FIG. 9f is an Event-Action Definition screen of the present invention.

Referring now to FIG. 9e, the B&R End of Day Log screen is shown. For any selected day, the system will retrieve and display all the results of all of the executed B&R actions for that day (B&R actions are also stored in the Transaction Log File, block 2060, FIG. 2). The system will also automatically total the credit balance and the debit balance for the day, in addition to calculating the net total balance for the day. FIG. 9f shows an Event-Action Definition screen, which allows internal personnel to select the action group to which and object/event combination will be assigned.

Thus, it can be seen that with the system of the present invention, the time and effort expended in communicating and consummating transactions is greatly diminished, while the access to and ability to process information is greatly increased.

The above described arrangement is merely illustrative of the principles of the present invention. Numerous modifications and adaptations thereof will be readily apparent to those skilled in the art without departing from the spirit and scope of the present invention.

What is claimed is:

1. In a system for implementing, managing and tracking financial transactions within a lending institution such that users may input and process loan transactions, said system comprising:

database means for storing and retrieving transaction data;

means for processing a set of system commands and responsively causing said database means to perform any of storing, retrieving or altering said transaction data;

means for inputting transaction data into said database means, approval means for allowing a user within said lending institution to review said transaction data and to authorize said transaction data;

means for determining if said authorized transaction data results in a funds transfer advice and for automatically generating said advice; and means for receiving collateral data from a financial institution outside of said system and for comparing said received collateral data with said inputted transaction data and automatically outputting an error message if said data are not equal.

2. The system as in claim 1, wherein said approval means includes allowing the user to perform maintenance operations, or alter or update said transaction data.

3. The system as in claim 1, further comprising:

means for allowing an authorized user to alter certain parameters of the trade or loan.

4. The system as in claim 1, further comprising:

means for allowing a customer to update or alter trade information data.

5. The system as in claim 1, further comprising:

means for checking any inputted data for errors.

6. In a system for implementing, managing and tracking financial transactions within a lending institution such that users may input and process loan transactions, said system comprising:

database means for storing and retrieve transaction data;

means for processing a set of system commands and responsively causing said database means to perform and of storing, retrieving or altering said transaction data;

means for inputting transaction data into said database means, approval means for allowing a user within said lending institution to review said transaction data and to authorize said transaction data;

means for determining if said authorized transaction data results in a funds transfer advise and for automatically generating said advice wherein said transaction data is comprised of a plurality of sets of collateral data, each of said sets of data having collateral parameter value, and system further comprising means for grouping at least two of said sets of collateral data such that when said parameter values are input into one of said at least tow sets, said means for grouping will automatically copy said parameter value into the others of said at least two sets of collateral data.

7. The system as in claim 6, wherein said approval means includes allowing the user to perform maintenance operations, or alter or update said transaction data.

8. The system as in claim 6, further comprising:

means for allowing an authorized user to alter certain parameters of the trade or loan.

9. The system as in claim 6, further comprising:

means for allowing a customer to update or alter trade information data.

10. The system as in claim 6, further comprising:

means for checking any inputted data for errors.

11. In a data processing system to support an integrated lending operation to release capital secured by various assets, said system comprising:

a data input module for entering selective user and lending profile data relating to assets offered as collateral and user attributes forming the basis of a whole loan file transaction;

a trading support module for receiving information from said user regarding capital requirements and implementing a trade to support said transaction;

a loan discount module for assessing said loan in terms of repayment support, including assessing support collateral and discounting said loan in accordance therewith; and output means for reporting a said whole loan file transaction.

12. The system of claim 11 wherein said loan discount module includes inputs regarding the quality of said loans.

* * * * *